(12) United States Patent
Hotelling et al.

(10) Patent No.: US 8,704,770 B2
(45) Date of Patent: *Apr. 22, 2014

(54) AMBIDEXTROUS MOUSE

(75) Inventors: Steve Hotelling, San Jose, CA (US); Brian Huppi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1134 days.

This patent is subject to a terminal disclaimer.

(21) Appl. No.: 12/188,988

(22) Filed: Aug. 8, 2008

(65) Prior Publication Data

US 2008/0297477 A1    Dec. 4, 2008

Related U.S. Application Data

(62) Division of application No. 10/654,108, filed on Sep. 2, 2003, now Pat. No. 7,808,479.

(51) Int. Cl.
*G06F 3/033*    (2013.01)

(52) U.S. Cl.
USPC .......................................... 345/163; 345/173

(58) Field of Classification Search
USPC .................................. 345/156–184
See application file for complete search history.

(56) References Cited

U.S. PATENT DOCUMENTS

| 4,110,749 A | 8/1978 | Janko et al. |
| 4,264,903 A | 4/1981 | Bigelow |
| 4,719,524 A | 1/1988 | Morishima et al. |
| 4,736,191 A | 4/1988 | Matzke et al. |
| 4,866,602 A | 9/1989 | Hall |
| 4,917,516 A | 4/1990 | Retter |
| 4,922,236 A | 5/1990 | Heady |
| 5,125,077 A | 6/1992 | Hall |
| 5,179,648 A | 1/1993 | Hauck |
| 5,186,646 A | 2/1993 | Pederson |
| 5,237,311 A | 8/1993 | Mailey et al. |
| D349,280 S | 8/1994 | Kaneko |
| 5,339,213 A | 8/1994 | O'Callaghan |
| 5,355,148 A | 10/1994 | Anderson |
| 5,404,152 A | 4/1995 | Nagai |

(Continued)

FOREIGN PATENT DOCUMENTS

| DE | 4125049 | 1/1992 |
| DE | 19722636 | 12/1998 |

(Continued)

OTHER PUBLICATIONS

Non-Final Office Action mailed Dec. 28, 2010, for U.S. Appl. No. 12/890,437, filed Sep. 24, 2010, 16 pages.

(Continued)

*Primary Examiner* — Dmitriy Bolotin
(74) *Attorney, Agent, or Firm* — Morrison & Foerster LLP

(57) ABSTRACT

An ambidextrous mouse is disclosed. The ambidextrous mouse is configured for both left and right handed use. The mouse may include right handed buttons on the front side of the mouse and left handed buttons on the back side of the mouse. The user may change the handedness of the mouse by rotating the mouse about a vertical axis of the mouse such that the left hand can use the left hand buttons and the right hand can use the right hand buttons. The mouse may include a handedness selection system for configuring the mouse for right handed or left handed use even though the mouse has the capability for both right and left hands.

25 Claims, 15 Drawing Sheets

(56) References Cited

U.S. PATENT DOCUMENTS

| | | |
|---|---|---|
| 5,414,445 A | 5/1995 | Kaneko et al. |
| 5,438,331 A | 8/1995 | Gilligan et al. |
| D362,431 S | 9/1995 | Kaneko et al. |
| 5,473,343 A | 12/1995 | Kimmich et al. |
| 5,473,344 A | 12/1995 | Bacon et al. |
| 5,483,261 A | 1/1996 | Yasutake |
| 5,488,204 A | 1/1996 | Mead et al. |
| 5,495,566 A | 2/1996 | Kwatinetz |
| 5,528,265 A | 6/1996 | Harrison |
| 5,559,943 A | 9/1996 | Cyr et al. |
| 5,561,445 A | 10/1996 | Miwa et al. |
| 5,565,887 A | 10/1996 | McCambridge et al. |
| 5,578,817 A | 11/1996 | Bidiville et al. |
| 5,585,823 A | 12/1996 | Duchon et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| D382,550 S | 8/1997 | Kaneko et al. |
| 5,661,505 A | 8/1997 | Livits |
| D385,542 S | 10/1997 | Kaneko et al. |
| 5,686,720 A | 11/1997 | Tullis |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,766,493 A | 6/1998 | Shin |
| 5,786,804 A | 7/1998 | Gordon |
| 5,786,818 A | 7/1998 | Brewer et al. |
| 5,808,602 A | 9/1998 | Sellers |
| 5,812,114 A | 9/1998 | Loop |
| 5,816,225 A | 10/1998 | Koch et al. |
| 5,825,352 A | 10/1998 | Bisset et al. |
| 5,825,353 A | 10/1998 | Will |
| 5,828,364 A | 10/1998 | Siddiqui |
| 5,835,079 A | 11/1998 | Shieh |
| 5,838,304 A | 11/1998 | Hall |
| 5,841,425 A * | 11/1998 | Zenz, Sr. .................. 345/163 |
| 5,841,426 A | 11/1998 | Dodson et al. |
| D402,281 S | 12/1998 | Ledbetter et al. |
| 5,850,213 A | 12/1998 | Imai et al. |
| 5,856,822 A | 1/1999 | Du et al. |
| 5,880,411 A | 3/1999 | Gillespie et al. |
| 5,880,715 A * | 3/1999 | Garrett ..................... 345/163 |
| 5,883,619 A | 3/1999 | Hoe et al. |
| 5,889,236 A | 3/1999 | Gillespie et al. |
| 5,903,229 A | 5/1999 | Kishi |
| 5,907,152 A | 5/1999 | Dändliker et al. |
| 5,907,318 A | 5/1999 | Medina |
| 5,909,211 A | 6/1999 | Combs et al. |
| 5,914,706 A | 6/1999 | Kono |
| 5,956,019 A | 9/1999 | Bang et al. |
| 5,959,611 A | 9/1999 | Smailagic et al. |
| 5,977,952 A * | 11/1999 | Francis ..................... 345/163 |
| 5,982,302 A | 11/1999 | Ure |
| 5,991,431 A | 11/1999 | Borza et al. |
| 5,999,166 A | 12/1999 | Rangan |
| 6,002,389 A | 12/1999 | Kasser et al. |
| 6,005,299 A | 12/1999 | Hengst |
| 6,031,518 A | 2/2000 | Adams et al. |
| 6,064,370 A | 5/2000 | Wang et al. |
| 6,072,471 A * | 6/2000 | Lo ........................... 345/163 |
| 6,075,533 A | 6/2000 | Chang |
| 6,084,574 A | 7/2000 | Bidiville |
| 6,097,372 A | 8/2000 | Suzuki |
| 6,111,563 A | 8/2000 | Hines |
| 6,115,028 A | 9/2000 | Balakrishnan et al. |
| 6,124,587 A | 9/2000 | Bidiville et al. |
| 6,128,006 A | 10/2000 | Rosenberg et al. |
| 6,130,664 A | 10/2000 | Suzuki |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| 6,188,389 B1 | 2/2001 | Yen |
| 6,188,391 B1 | 2/2001 | Seely et al. |
| 6,188,393 B1 | 2/2001 | Shu |
| 6,191,774 B1 | 2/2001 | Schena et al. |
| 6,198,473 B1 | 3/2001 | Armstrong |
| 6,208,329 B1 | 3/2001 | Ballare |
| 6,211,861 B1 | 4/2001 | Rosenberg |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,232,957 B1 | 5/2001 | Hinckley |
| D443,616 S | 6/2001 | Fisher et al. |
| 6,243,078 B1 | 6/2001 | Rosenberg |
| 6,256,011 B1 | 7/2001 | Culver |
| 6,262,717 B1 | 7/2001 | Donohue et al. |
| 6,266,050 B1 | 7/2001 | Oh et al. |
| 6,297,795 B1 | 10/2001 | Kato et al. |
| 6,310,610 B1 | 10/2001 | Beaton et al. |
| 6,323,843 B2 | 11/2001 | Giles et al. |
| 6,323,845 B1 | 11/2001 | Robbins |
| 6,323,846 B1 | 11/2001 | Westerman et al. |
| 6,327,011 B2 | 12/2001 | Kim |
| 6,333,734 B1 | 12/2001 | Rein |
| 6,337,919 B1 * | 1/2002 | Dunton ..................... 382/124 |
| 6,340,800 B1 | 1/2002 | Zhai et al. |
| D454,568 S | 3/2002 | Andre et al. |
| 6,356,524 B2 | 3/2002 | Aratani |
| 6,362,811 B1 * | 3/2002 | Edwards et al. ............ 345/163 |
| 6,369,797 B1 | 4/2002 | Maynard |
| 6,373,470 B1 | 4/2002 | Andre et al. |
| 6,377,530 B1 | 4/2002 | Burrows |
| 6,392,632 B1 | 5/2002 | Lee |
| 6,392,634 B1 | 5/2002 | Bowers et al. |
| 6,392,636 B1 | 5/2002 | Ferrari et al. |
| 6,433,780 B1 | 8/2002 | Gordon et al. |
| 6,469,693 B1 | 10/2002 | Chiang et al. |
| 6,489,947 B2 | 12/2002 | Hesley et al. |
| 6,505,088 B1 | 1/2003 | Simkin et al. |
| 6,513,717 B2 | 2/2003 | Hannigan |
| 6,545,665 B2 | 4/2003 | Rodgers |
| 6,559,830 B1 | 5/2003 | Hinckley et al. |
| 6,567,073 B1 * | 5/2003 | Levin ........................ 345/163 |
| 6,587,091 B2 | 7/2003 | Serpa |
| 6,587,093 B1 | 7/2003 | Shaw et al. |
| 6,614,422 B1 | 9/2003 | Rafii et al. |
| 6,636,197 B1 | 10/2003 | Goldenberg et al. |
| 6,639,584 B1 | 10/2003 | Li |
| 6,650,975 B2 | 11/2003 | Ruffner |
| 6,677,927 B1 | 1/2004 | Bruck et al. |
| 6,686,904 B1 | 2/2004 | Sherman et al. |
| 6,690,387 B2 | 2/2004 | Zimmerman et al. |
| 6,700,564 B2 | 3/2004 | McLoone |
| 6,703,550 B2 | 3/2004 | Chu |
| 6,703,599 B1 | 3/2004 | Casebolt et al. |
| 6,707,027 B2 | 3/2004 | Liess et al. |
| 6,717,569 B1 | 4/2004 | Gruhl et al. |
| 6,724,366 B2 | 4/2004 | Crawford |
| 6,724,817 B1 | 4/2004 | Simpson et al. |
| 6,727,889 B2 | 4/2004 | Shaw |
| 6,738,045 B2 | 5/2004 | Hinckley et al. |
| 6,740,860 B2 | 5/2004 | Kobayashi |
| 6,762,751 B2 | 7/2004 | Kuan |
| 6,788,288 B2 | 9/2004 | Ano |
| 6,791,533 B2 | 9/2004 | Su |
| 6,795,056 B2 | 9/2004 | Norskog et al. |
| 6,795,057 B2 | 9/2004 | Gordon |
| 6,816,149 B1 | 11/2004 | Alsleben |
| 6,816,150 B2 | 11/2004 | Casebolt et al. |
| 6,828,958 B2 | 12/2004 | Davenport |
| 6,833,825 B1 | 12/2004 | Farag et al. |
| 6,844,871 B1 | 1/2005 | Hinckley et al. |
| 6,844,872 B1 | 1/2005 | Farag et al. |
| 6,848,014 B2 | 1/2005 | Landron et al. |
| 6,865,718 B2 | 3/2005 | Levi |
| 6,950,094 B2 | 9/2005 | Gordon et al. |
| 6,992,656 B2 | 1/2006 | Hughes |

(56) References Cited

U.S. PATENT DOCUMENTS

| | | | |
|---|---|---|---|
| 6,995,744 | B1 | 2/2006 | Moore et al. |
| 7,015,894 | B2 | 3/2006 | Morohoshi |
| 7,046,230 | B2 | 5/2006 | Zadesky et al. |
| 7,051,291 | B2 | 5/2006 | Sciammarella et al. |
| 7,119,792 | B1 | 10/2006 | Andre et al. |
| 7,142,193 | B2 | 11/2006 | Hayama |
| 7,164,412 | B2 | 1/2007 | Kao |
| 7,168,047 | B1 | 1/2007 | Huppi |
| 7,170,488 | B2 | 1/2007 | Kehlstadt et al. |
| 7,184,064 | B2 | 2/2007 | Zimmerman et al. |
| 7,233,318 | B1 | 6/2007 | Farag |
| 7,239,800 | B2 | 7/2007 | Bilbrey |
| 7,629,961 | B2 * | 12/2009 | Casebolt et al. ............ 345/166 |
| 7,663,607 | B2 | 2/2010 | Hotelling et al. |
| 7,808,479 | B1 | 10/2010 | Hotelling et al. |
| 8,479,122 | B2 | 7/2013 | Hotelling et al. |
| 8,537,115 | B2 | 9/2013 | Hotelling et al. |
| 2001/0011991 | A1 | 8/2001 | Wang et al. |
| 2001/0011995 | A1* | 8/2001 | Hinckley et al. ............ 345/156 |
| 2001/0043545 | A1 | 11/2001 | Aratani |
| 2001/0050673 | A1 | 12/2001 | Davenport |
| 2001/0051046 | A1 | 12/2001 | Watanabe et al. |
| 2002/0033848 | A1 | 3/2002 | Sciammarella et al. |
| 2002/0063688 | A1 | 5/2002 | Shaw et al. |
| 2002/0084986 | A1* | 7/2002 | Armstrong ............... 345/163 |
| 2002/0089545 | A1 | 7/2002 | Levi |
| 2002/0093487 | A1 | 7/2002 | Rosenberg |
| 2002/0118169 | A1 | 8/2002 | Hinckley et al. |
| 2002/0118174 | A1 | 8/2002 | Rodgers |
| 2002/0130839 | A1 | 9/2002 | Wallace et al. |
| 2002/0130841 | A1 | 9/2002 | Scott |
| 2002/0140676 | A1* | 10/2002 | Kao ......................... 345/163 |
| 2002/0154090 | A1 | 10/2002 | Lin |
| 2002/0164156 | A1 | 11/2002 | Bilbrey |
| 2003/0043121 | A1 | 3/2003 | Chen |
| 2003/0050092 | A1 | 3/2003 | Yun |
| 2003/0076301 | A1 | 4/2003 | Tsuk et al. |
| 2003/0076303 | A1 | 4/2003 | Huppi |
| 2003/0076306 | A1 | 4/2003 | Zadesky et al. |
| 2003/0095096 | A1 | 5/2003 | Robbin et al. |
| 2003/0098851 | A1 | 5/2003 | Brink |
| 2003/0107551 | A1 | 6/2003 | Dunker |
| 2003/0107552 | A1 | 6/2003 | Lu |
| 2003/0184517 | A1 | 10/2003 | Senzui et al. |
| 2003/0184520 | A1* | 10/2003 | Wei ......................... 345/163 |
| 2004/0046741 | A1 | 3/2004 | Low et al. |
| 2004/0239622 | A1 | 12/2004 | Proctor et al. |
| 2004/0242269 | A1 | 12/2004 | Fadell |
| 2004/0252109 | A1 | 12/2004 | Trent et al. |
| 2005/0030278 | A1* | 2/2005 | Fu ........................... 345/156 |
| 2005/0084138 | A1* | 4/2005 | Inkster et al. ............. 382/115 |
| 2005/0110768 | A1 | 5/2005 | Marriott et al. |
| 2005/0228320 | A1 | 10/2005 | Klinghult |
| 2005/0259077 | A1 | 11/2005 | Adams |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2008/0297476 | A1 | 12/2008 | Hotelling et al. |
| 2008/0297478 | A1 | 12/2008 | Hotelling et al. |
| 2011/0012835 | A1 | 1/2011 | Hotelling et al. |

FOREIGN PATENT DOCUMENTS

| | | |
|---|---|---|
| DE | 10022537 | 11/2000 |
| DE | 10201193 | 7/2003 |
| EP | 0 498 540 A2 | 1/1992 |
| EP | 0653725 | 5/1995 |
| EP | 0768619 | 4/1997 |
| EP | 0795837 | 9/1997 |
| EP | 0 880 Q91 A2 | 11/1998 |
| EP | 1 026 713 A1 | 8/2000 |
| JP | 03/237520 | 10/1991 |
| JP | 07-319001 | 12/1995 |
| JP | 63106826 A | 5/1998 |
| JP | 10326149 A | 12/1998 |
| JP | 11-194863 | 7/1999 |
| JP | 11-194872 | 7/1999 |
| JP | 11-194883 | 7/1999 |
| JP | 2000-163031 A | 6/2000 |
| JP | 2000-215549 | 8/2000 |
| JP | 2000242424 | 9/2000 |
| JP | 2001-051790 | 2/2001 |
| JP | 1241558 | 9/2002 |
| JP | 2002-342033 A | 11/2002 |
| JP | 2003280807 | 2/2003 |
| TW | 431607 | 4/2001 |
| WO | WO 90/05972 | 5/1990 |
| WO | WO 94/17494 | 8/1994 |
| WO | WO 98/14863 | 4/1998 |
| WO | WO 99/26330 | 5/1999 |
| WO | WO 99/49443 | 9/1999 |
| WO | WO 00/39907 | 7/2000 |
| WO | WO 02052494 | 7/2002 |
| WO | WO 03077110 | 9/2003 |
| WO | WO 2006/132817 | 12/2006 |

OTHER PUBLICATIONS

Final Office Action mailed Feb. 2, 2007, for U.S. Appl. No. 10/654,108, filed Sep. 2, 2003, 16 pages.
Final Office Action mailed Nov. 16, 2007, for U.S. Appl. No. 10/654,108, filed Sep. 2, 2003, 12 pages.
Final Office Action mailed Feb. 18, 2009, for U.S. Appl. No. 10/654,108, filed Sep. 2, 2003, 12 pages.
Non-Final Office Action mailed Jun. 16, 2006, for U.S. Appl. No. 10/654,108, filed Sep. 2, 2003, 7 pages.
Non-Final Office Action mailed Jul. 6, 2007, for U.S. Appl. No. 10/654,108, filed Sep. 2, 2003, 13 pages.
Non-Final Office Action mailed Oct. 28, 2008, for U.S. Appl. No. 10/654,108, filed Sep. 2, 2003, 10 pages.
"About Quicktip®" www.logicad3d.com/docs/qt.html, downloaded Apr. 8, 2002.
"OEM Touchpad Modules" website www.glidepoint.com/sales/modules.index.shtml, downloaded Feb. 13, 2002.
"Product Overview—ErgoCommander®", www.logicad3d.com/products/ErgoCommander.htm, downloaded Apr. 8, 2002.
"Product Overview—SpaceMouse® Classic", www.logicad3d.com/products/Classic.htm, downloaded Apr. 8, 2002.
Sylvania, "Intellivision™ Intelligent Television Master Component Service Manual," pp. 1, 2 and 8, 1979.
Gadgetboy, "Point and click with the latest mice", CNETAsia Product Review, www.asia.cnet.com/reviews...are/gadgetboy/0,39001770,38023590,00.htm, downloaded Dec. 5, 2001.
Tessler et al. "Touchpads Three new input devices", website www.macworld.com/1996/02/review/1806.html, download Feb. 13, 2002.
"Synaptics Tough Pad Interfacing Guide" Second Edition, Mar. 25, 1998, Synaptics, Inc. San Jose, CA, pp. 1 to 90.
Fiore, Andrew, "Zen Touchpad", Cornell University, May 2000.
Flaminio, Michael, "IntelliMouse Explorer", IGM Review, Oct. 4, 1999.
Grevstad, Eric, "Microsoft Wireless IntelliMouse Explorer Review The Ultimate Pointing Machine", HardwareCentral Review, Jun. 24, 2003.
Grevstad, Eric, "Microsoft Wireless IntelliMouse Explorer Review The Ultimate Pointing Machine", HardwareCentral Review, Oct. 9, 2001.
Dreier, Troy, "The Comfort Zone", PC Magazine, Mar. 12, 2002.
Apple Computer, Inc., "Apple Pro Mouse," Jul. 2000, Apple Pro Mouse Design Innovations product specification, pp. 1-11.
David Nagel, "More Details on the New Pro Keyboard and Button-Less Mouse," Jul. 2000, http://www.creativemac.com/HTM/News/07_00/detailskeyboardmouse,htm pp. 1-2.
John Siracusa, "MacWorld Expo NY 2000," Jul. 2000, http://www.arstechnic.com/wanderdesk/3q00/macworld2k/mwny-2.html pp. 1-6.
Microsoft Inc., "Scroll and zoom on a Microsoft Excel sheet by using the Microsoft Intellimouse pointing device" 1999, pp. 1-3.
"System Service and Troubleshooting Manual", www.dsplib.com/intv/Master, downloaded Dec. 11, 2002.

(56) References Cited

OTHER PUBLICATIONS

"Der Klangmeister," Connect Magazine, Aug. 1998.
Bang & Olufsen Telecom a/s, "BeoCom 6000 User Guide 2000".
BeoCom 6000, Sales Training Brochure, date unknown.
Chapweske, Adam, "PS/2 Mouse/Keyboard Protocol", 1999, http://panda.cs.ndsu.nodak.edu/~achapwes/PICmicro/PS2/ps2.htm.
De Meyer, Kevin, Crystal Optical Mouse, Feb. 14, 2002, Heatseekerz, Web Article 19.
Ken Hinckley et al. "Touch-Sensing Input Devices" CHI 1999 pp. 223-230.
Letter re: Bang & Olufsen A/S, by David Safran, Nixon Peabody, LLP, May 21, 2004.
Photographs of Innovations 2000 Best of Show award presented at the 2000 International CES Innovations 2000 Design & Engineering Showcase, 1 pg.
International Search Report from related application No. PCT/US2006/020341 dated Jun. 12, 2007.
EPO Form 1507 in related EP Application No. 02761784.4 dated Nov. 19, 2004.
"Neuros MP3 Digital Audio Computer", www.neurosaudio.com, downloaded Apr. 9, 2003.
"Apple Unveils Optical Mouse and New Pro Keyboard," Press Release, Jul. 19, 2000.
U.S. Appl. No. 29/231,465, filed Jun. 3, 2005.
U.S. Appl. No. 60/364,400, filed Mar. 13, 2002.
"Logitech's MX Air Is No Longer Vapor," Gizmodo Australia, retrieved from http://www.gizmodo.com.au/2007/07/logitechs_mx_air_is_no_longer.html on Jan. 11, 2008.
Final Office Action mailed Jan. 19, 2010, for U.S. Appl. No. 10/654,108, filed Sep. 2, 2003, 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Jul. 14, 2009, for U.S. Appl. No. 10/654,108, filed Sep. 2, 2003, 16 pages.
Notice of Allowance mailed Jun. 1, 2010, for U.S. Appl. No. 10/654,108, filed Sep. 2, 2003, six pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Apr. 19, 2011, for U.S. Appl. No. 12/890,437, filed Sep. 24, 2010, 19 pages.
Non-Final Office Action mailed May 6, 2011, for U.S. Appl. No. 12/188,948, filed Aug. 8, 2008, 10 pages.
Non-Final Office Action mailed May 6, 2011, for U.S. Appl. No. 12/189,030, filed Aug. 8, 2008, seven pages.
Final Office Action mailed Jun. 20, 2013, for U.S. Appl. No. 12/189,030, filed Aug. 8, 2008, 17 pages.
Notice of Allowance mailed Jun. 18, 2013, for U.S. Appl. No. 12/890,437, filed Sep. 24, 2010, 11 pages.
Final Office Action mailed Oct. 14, 2011, for U.S. Appl. No. 12/189,030, filed Aug. 8, 2008, 15 pages.
Final Office Action mailed Dec. 7, 2011, for U.S. Appl. No. 12/188,948, filed Aug. 8, 2008, 13 pages.
Non-Final Office Action mailed Nov. 28, 2012, for U.S. Appl. No. 12/189,030, filed Aug. 8, 2008, 16 pages.
Non-Final Office Action mailed Aug. 21, 2013, for U.S. Appl. No. 12/188,948, filed Aug. 8, 2008, 13 pages.

* cited by examiner

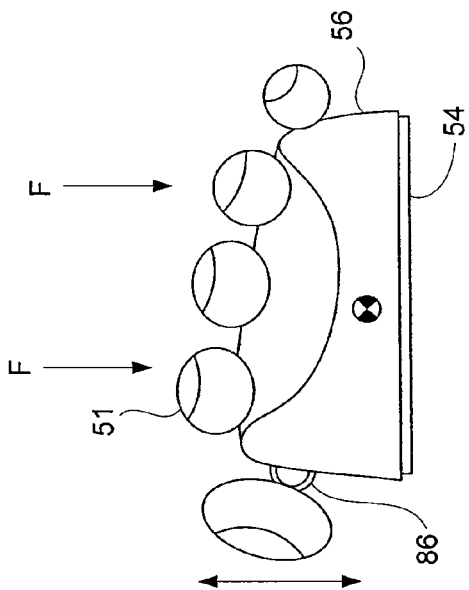
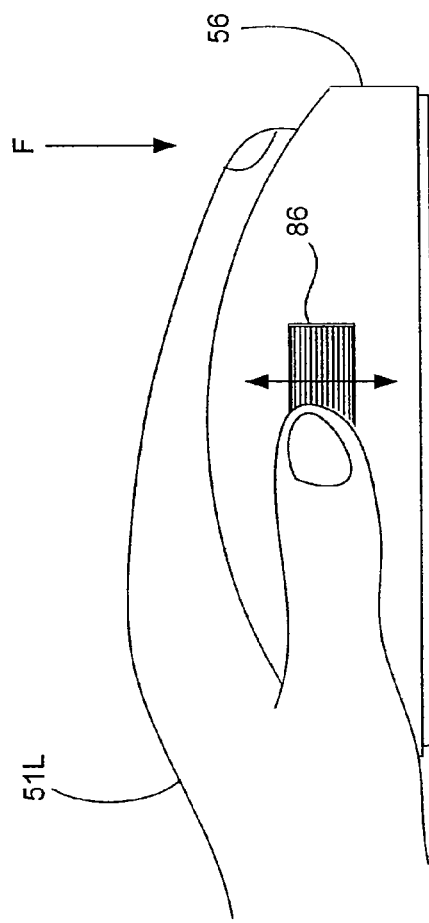
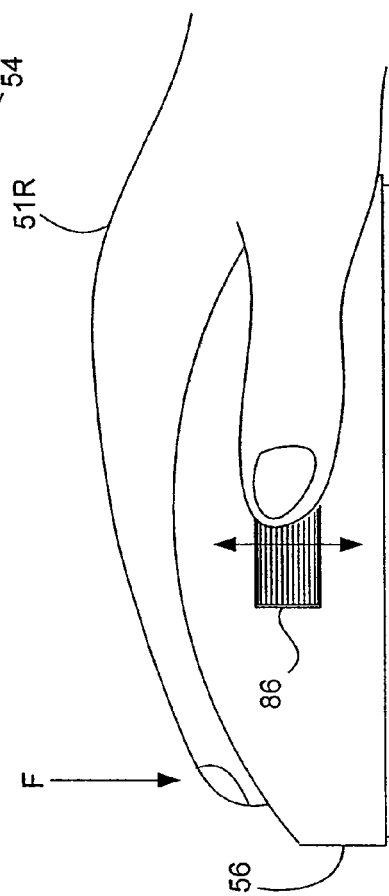
FIG. 2G
FIG. 2E
FIG. 2F

AMBIDEXTROUS MOUSE

CROSS-REFERENCE TO RELATED APPLICATIONS

This application is a division of U.S. patent application Ser. No. 10/654,108 filed Sep. 2, 2003, the entire disclosure of which is incorporated herein by reference.

BACKGROUND OF THE INVENTION

1. Field of the Invention

The present invention relates generally to an input device for use in a computer system. More particularly, the present invention relates to an ambidextrous mouse.

2. Description of the Related Art

Most computer systems, as for example general purpose computers such as portable computers and desktop computers, receive input from a user via an input device such as a mouse. As is generally well known, the mouse allows a user to move an input pointer (e.g., cursor) and to make selections with respect to a graphical user interface (GUI) on a display screen. The mouse typically includes a trackball or optical sensor (located at the bottom side of the mouse) for translating the motion of the users hand into signals that the computer system can use. For example, by positioning the mouse on a desktop and moving it thereon, the user can move an input pointer or cursor in similar directions within the GUI. The mouse also conventionally includes one or more buttons, which are located on the top side of the mouse. These one or more buttons, when selected, can initiate a GUI action such as menu or object selections. The one or more buttons are typically provided by on or more button caps that move relative to the housing (e.g., through an opening in the housing). Mice may also include a scroll wheel to give the user scrolling functionality. The scroll wheel saves time and steps, and allows a user to move through documents by physically rolling the wheel forward or backward-instead of clicking on the scroll bar displayed on the GUI. In the past, scrolling was implemented by selecting the scroll bar with the mouse, and moving the scroll bar on the GUI by moving the mouse up or down. Furthermore, many popular mice offer an asymmetric shape that fits the asymmetric shape of the hand. Unfortunately, an asymmetric mouse is handed, i.e., it can only be used by a right or left hand.

Although mice designs such as those described above work well, there are continuing efforts to improve their form, feel and functionality.

SUMMARY OF THE INVENTION

The invention relates, in one embodiment, to an ambidextrous mouse configured for left and right handed use. The handedness of the mouse is changed by rotating the mouse about a vertical axis of the mouse by 180 degrees.

The invention relates, in another embodiment, to a touch sensitive mouse comprising a touch sensitive surface that senses a user's touch when the user grabs the mouse.

The invention relates, in another embodiment, to a computing system. The computing system includes a computer. The computing system also includes a mouse operatively coupled to the computer. The mouse includes a position sensing device and a touch sensing device. The position sensing device is configured to generate tracking signals when the mouse is moved relative to a surface. The touch sensing device is configured to generate hand signals when a hand is placed over the mouse.

The invention relates, in another embodiment, to a method for operating a mouse having one or more buttons. The method includes determining if a user is touching the mouse. The method also includes determining the user based on the user's touch. The method additionally includes configuring the mouse based on the user.

The invention relates, in another embodiment, to a user determination method for a mouse. The method includes providing baseline hand signals. The method also includes generating a current hand signal when a user grabs the mouse. The method further includes comparing the current hand signal to at least one baseline hand signal. The method additionally includes determining a characteristic of the user based on the current and baseline hand signals.

The invention relates, in another embodiment, to a method for operating a mouse. The method includes determining if a user is touching the mouse. The method also includes determining the handedness of the user based on the user's touch. The method further includes configuring the motion axes of the mouse based on the handedness of the user. The method additionally includes generating position signals based on mouse movement and the motion axes. Moreover, the method includes sending the position signals to a host. The method also includes forming previous and current hand images and calculating the difference between the previous and current hand images. Thereafter, the method further includes generating control signals based on the difference between the previous and current hand images and sending the control signal to the host.

BRIEF DESCRIPTION OF THE DRAWINGS

The invention will be readily understood by the following detailed description in conjunction with the accompanying drawings, wherein like reference numerals designate like structural elements, and in which:

FIG. 2E is a side view of the unibody ambidextrous mouse shown of FIG. 2A in use, in accordance with one embodiment of the present invention.

FIG. 2F is a side view of the unibody ambidextrous mouse shown of FIG. 2A in use, in accordance with one embodiment of the present invention.

FIG. 2G is a front view of the unibody ambidextrous mouse shown of FIG. 2A in use, in accordance with one embodiment of the present invention.

DETAILED DESCRIPTION OF THE INVENTION

The invention generally pertains to an ambidextrous mouse that can be used equally by both left and right hands. One aspect of the invention corresponds to a mouse that has the same feel and function for both the left and right hands. Another aspect of the invention corresponds to a mouse having a handedness selection system for configuring the mouse for right and left hand use. Another aspect of the invention corresponds to a mouse having a touch sensing device capable of sensing a user's touch when a user positions their hand over the mouse. The sensed user's touch may be used to determine characteristics of the user as well as to identify the user. The sensed user's touch may also be used to perform button functions.

These and other embodiments of the invention are discussed below with reference to FIGS. 1-14. However, those skilled in the art will readily appreciate that the detailed description given herein with respect to these figures is for explanatory purposes as the invention extends beyond these limited embodiments.

Figure 1:
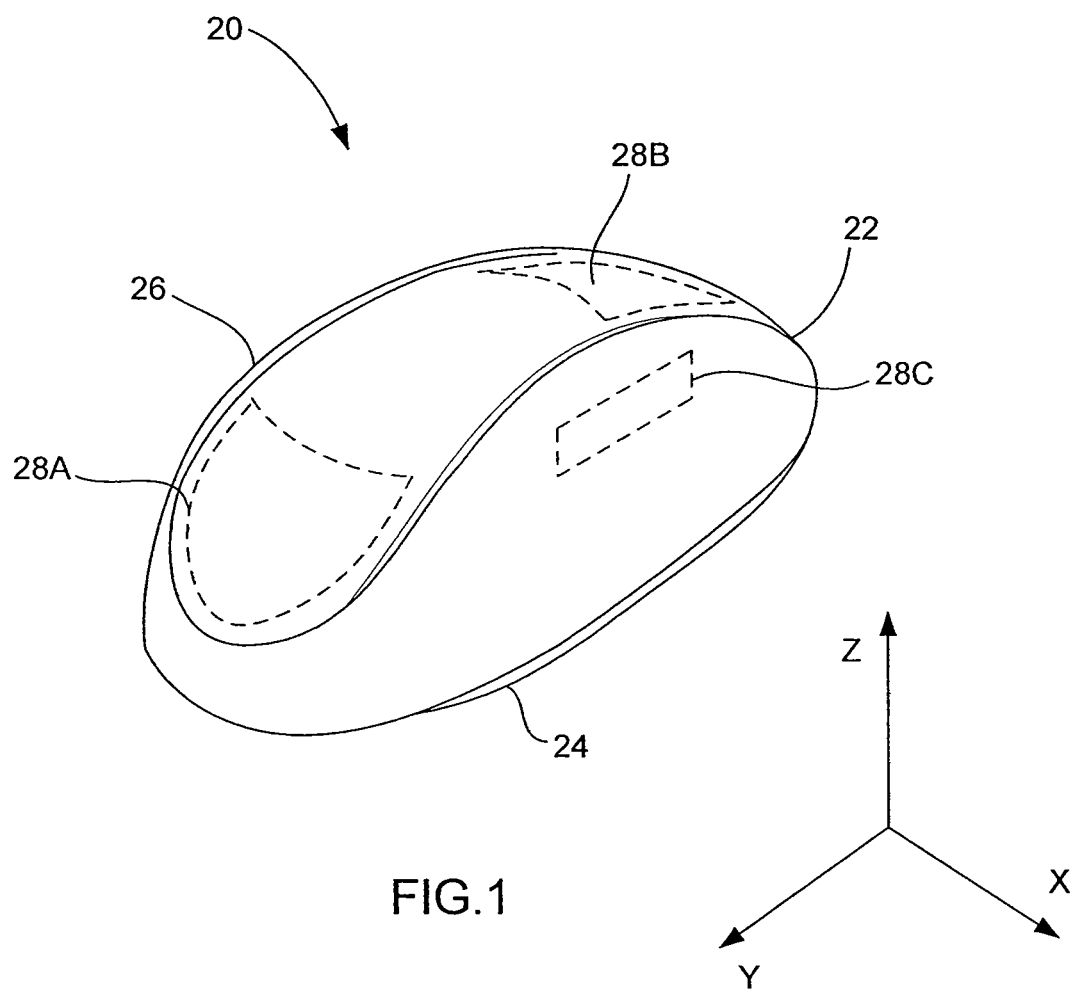
FIG. 1 is a perspective diagram of a mouse, in accordance with one embodiment of the present invention.

FIG. 1 is a perspective diagram of a mouse 20, in accordance with one embodiment of the invention. The mouse 20 is a handheld device for providing user commands to a host system. In most cases, the mouse is configured to control movements and/or performing actions on a graphical user interface of a display screen associated with a computer system. The mouse may be coupled to the host system via a wired or wireless connection. In the case of wired connections, the mouse may include a cable for connecting to the host system. In the case of wireless connections, the mouse may include a radio frequency (RF) link, optical infrared (IR) link, Bluetooth link or the like in order to eliminate the cable. In the illustrated embodiment, the mouse includes a wireless link, thus there are no cables or cords extending therefrom.

The mouse 20 generally includes a housing 22 that provides a structure for moving the mouse 20 along a surface and for gripping the mouse 20 for movement thereof. The housing 22 also helps to define the shape or form of the mouse 20. That is, the contour of the housing 22 embodies the outward physical appearance of the mouse 20. The contour may be rectilinear, curvilinear or both. In most cases, a bottom member 24 of the housing has an external contour that substantially conforms to the contour of a flat surface such as a desktop. In addition, a top member 26 of the mouse housing 22 generally has an external contour that substantially conforms to the contour of the inside surface of a hand. The top member 26 may be symmetric and/or asymmetric. Asymmetric mice are typically handed (e.g., dedicated to either the left or right hand) and symmetric mice are typically ambidextrous (e.g., capable of being used by both the left and right hand). In the illustrated embodiment, the lateral shape of the top member 26 (e.g., cross section in the X-Z plane) is asymmetric in order to provide ergonomic comfort to the asymmetric hand and the longitudinal shape of the top member 26 (e.g., cross section in the Y-Z plane) is symmetric in order to allow the mouse to be used by either hand (ambidextrous). With regards to ambidextrous, the mouse 20 may be rotated about the vertical axis by 180 degrees to change usage from right handed to left handed (or vice versa).

The housing 22 also provides a structure for enclosing, containing and/or supporting the components of the mouse 20. Although not shown, the components may correspond to electrical and/or mechanical components for operating the mouse 20. For example, the components may include a track ball or optical assembly for monitoring the movement of the mouse 20 along a surface and for sending signals corresponding to the movements to the host system. In most cases, the signals produced by these components direct an input pointer to move on a display screen in a direction similar to the direction of the mouse 20 as it is moved across a surface. For example, when the mouse 20 is moved forward or backwards, the input pointer is moved vertically up or down, respectively, on the display screen. In addition, when the mouse 20 is moved from side to side, the input pointer is moved from side to side on the display screen.

The mouse 20 also includes one or more buttons 28 for performing actions on the display screen. In most cases, the user simply presses on the button 28 in order to perform the action. By way of example, the actions may include selecting an item on the screen, opening a file or document, executing instructions, starting a program, viewing a menu, and/or the like. The button functions may also include functions that make it easier to navigate through the host system, as for example, zoom, scroll, open different menus, home the input pointer, perform keyboard related actions such as enter, delete, insert, page up/down, and the like.

The buttons 28 generally include one or more actuators (not shown in FIG. 1) for sensing and/or detecting when a user's finger has pressed on the button 28. The actuators may be configured to detect when the button 28 moves and/or they may be configured to detect the presence of the user's hand on the button 28. The actuators may also be capable of sensing the amount of pressure being exerted on a button 28 by the user's hand. The actuators may be switches, sensors and/or the like. By way of example, the switches may correspond to tact switches, optical switches, and the like. In addition, the sensors may correspond to optical sensors, resistive sensors, surface acoustic wave sensors, pressure sensors (e.g., strain gauge), capacitive sensors and the like.

The position of the buttons 28 relative to the mouse housing 22 may be widely varied. For example, the buttons 28 may be positioned almost anywhere (e.g., top, side, front, or back) on the mouse housing 22 so long as they are accessible to a user during manipulation of the mouse 20. Any number of buttons may be used. In most cases, the number of buttons correspond to the number of button functionalities offered by the mouse. For handed mice, a single button is typically provided if a single click is desired, and two buttons are provided if right and left clicks are desired. In some cases, more than two buttons are provided if a center click or scroll function is further desired. For ambidextrous mice, the mouse includes one or more buttons on opposing sides of the mouse, as for example on both the front and back of the mouse (e.g., 180 degrees opposite). This is done to ensure that both the left and right hands have a button(s). Like handed mice, each side of the ambidextrous mouse may include multiple buttons (e.g., right click, left click, center click, scroll, etc.). Furthermore, the buttons may be formed from almost any shape (e.g., squares, circles, ovals, triangles, rectangles, polygons, and the like). The shape of multiple buttons may have identical shapes or they may have different shapes. In addition, the size of the buttons may vary according to the specific needs of each device. In most cases, the size of the buttons corresponds to a size that allows them to be easily manipulated by a user (e.g., the size of a finger tip or larger).

In the illustrated embodiment, the mouse 20 is an ambidextrous mouse and therefore it includes a separate button 28A and 28B on both the front and back of the mouse. The ambidextrous mouse also includes a button 28C on the side of the mouse. The front button 28A may be actuated by a right handed user, the back button 28B may be actuated by a left handed user and the side button 28C may be actuated by the thumb of both the left and right hands. As should be appreciated, the mouse configuration shown in FIG. 1 allows for the same "feel" and the same "function" (e.g., left and right handed buttons as well as a thumb button) for both the right handed and left handed users. That is, the mouse contour provides the user with asymmetric comfort to both the left and right handed users while the button configuration allows similar button functionality to both the left and right handed users. As mentioned above, the "handedness" is switched by turning the mouse 180 degrees.

The manner in which the buttons 28 may be implemented can be widely varied. For example, they may be selected from button caps, wheels, unified button housings, touch sensitive button housings and/or the like. Button caps or wheels typically work independent of and move relative to the housing 22. For example, the button cap may pivot or translate relative to the top member 26 and the wheel may rotate relative to the top member 26. In most cases, the movement of the button cap or wheel actuates one or more switches or sensors enclosed within the housing 22. For example, the button cap may actuate a tact switch located within the housing and the wheel may actuate an encoder located within the housing. The moving button cap or wheel may or may not produce a mechanical clicking action. As should be appreciated, a mechanical clicking action typically gives audible and tactile feedback to the user when the user presses on the button. In cases where there is no mechanical clicking action, the mouse may include audible and tactile feedback generators so that a user knows when the button has been actuated.

Additionally or alternatively, the buttons 28 may be provided by a unified button/housing that incorporates the functionality of a button (or buttons) directly into the housing 22 of the mouse 20, i.e., the button functionality and a substantial portion of the housing are combined (as opposed to attaching separate button caps or wheels to or through the housing). In a unified button housing, the housing 22 includes a movable member so as to actuate one or more switches or sensors enclosed within the housing 22. For example, the top member 26 may move relative to the bottom member 24 thus initiating the button function. The manner in which the top member 26 moves relative to the bottom member 24 may be widely varied. For example, the top member 26 may pivot, translate or rotate relative to the bottom member 24. In a unified button housing, the areas of the housing 22 that move generally take the form of button zones that represent regions of the mouse housing 22 that may be pressed on to implement one or more button functions. In essence, the housing 22 serves as a button (or buttons) of the mouse 20. Like the button cap and wheel, the unified button housing may or may not produce a clicking action. By way of example, a description of unified button housing such as that described in this paragraph may be found in commonly owned U.S. Pat. No. 6,373,470 and patent application Ser. No. 10/060,712, both of which are herein incorporated by reference.

Additionally or alternatively, the buttons 28 may be provided by touch sensitive surfaces on the housing 22. In this implementation, the switches and/or sensors of the button 28 produce working areas in the form of button zones that activate when a finger sits on, presses, or passes over them. The sensors may be contained within the housing 22 or they may be embedded in the housing 22 itself.

Furthermore, the touch sensitive surfaces may be placed on stationary or moving parts of the mouse 20. In the case of stationary, they may be placed on a mouse where the top member and bottom member are fixed to one another thereby preventing movements therebetween. In the case of moving, they may be placed on a button cap that moves relative to the top member 26, or a top member 26 that moves relative to the bottom member 24 (e.g., unified button housing).

Although not shown in FIG. 1, the mouse 20 may further include a handedness selection system for configuring the mouse for right handed or left handed use even though the mouse 20 has the capability for both right and left hands. In one embodiment, the handedness selection system is a user actuated system that allows a user to select which hand configuration is desired (e.g., left or right). The user actuated system may be widely varied. For example, it may include a mechanism or switch arrangement that activates and deactivates the opposing buttons. In one implementation, the mechanism is a shuttle member that includes a tab that physically prevents button movement (or actuation of the corresponding indicator) on one side of the mouse 20 while allowing button movement on the other side of the mouse 20. In another implementation, the switch is a mechanical, electrical or optical switch that activates or deactivates the indicators associated with the buttons, i.e., opens or closes the circuits associated with the actuators. In both implementations, the right handed button can be turned on and the left handed button off or the right handed button can be turned off the left handed button turned on. As should be appreciated, this is generally done to prevent the palm of the hand from actuating the opposing zone when positioned thereon during use In most cases, the mouse 20 is set as a right handed mouse (e.g., factory default). The switch, however, allows the user to quickly and easily reconfigure the mouse 20 for left handed use if needed. Alternatively, the handedness of the mouse 20 may be selected via software as for example through a control panel located on a graphical user interface.

In another embodiment, the handedness selection system is a mouse actuated system that allows the mouse 20 (or system connected thereto) to automatically configure the mouse 20 for right handed or left handed use based on how the user grabs the mouse 20 (e.g., position and pressure). If a left handed user grabs the mouse, then the mouse configures itself to be a left handed mouse during use. If a right handed user grabs the mouse, then the mouse configures itself to be a right handed mouse. Like the user actuated system, the mouse actuated system may be widely varied. For example, the system may include a sensor arrangement arranged to detect the hand on the surface of the mouse when a user grabs the mouse and thereafter make a determination as to whether the hand is left or the right hand based on what was detected. For example, if sensors detect the presence of fingers on area 28A and a palm on area 28B then the mouse can determine that the mouse is being used by a right handed user. Once the determination is made, the mouse 20 can turn on the functionality of the buttons 28 corresponding to the hand being used and turn off the functionality of the buttons corresponding to the hand not in use.

The sensor arrangement may also be configured to help make a determination as to how the user is holding the mouse. As should be appreciated, each user holds the mouse in a different manner and thus there may be discrepancies between how the user perceives the actuation of a button and how the mouse interprets the actuation of a button. By way of example, the sensor arrangement may help determine that the fingers are positioned in a particular manner with a particular amount of pressure therefore the user is trying to initiate a particular type of action (e.g., make a right click rather than a left click or vice versa). The sensor arrangement may also double as the actuator of a button (e.g., touch sensitive button housing). By way of example, the sensor arrangement may include touch sensitive sensors such as resistive sensors, surface acoustic wave sensors, pressure sensors (e.g., strain gauge), capacitive sensors and the like. An example of touch sensitive mice, which contain sensor arrangements, can be found in commonly owned U.S. patent application Ser. No. 10/157,343, which is herein incorporated by reference.

FIGS. 2A-2F are diagrams of a unibody ambidextrous mouse 50, in accordance with one embodiment of the present invention. By way of example, the mouse 50 may correspond to the mouse 20 shown in FIG. 1. The term "unibody" herein refers to a mouse that integrates at least one button function directly into the mouse housing 52, i.e., unified button/housing. The term "ambidextrous" herein refers to a mouse that is capable of being used by both a left and right hand 51, i.e., the mouse is not handed.

The unibody ambidextrous mouse 50 generally includes a mouse housing 52 that contains the circuitry of the mouse 50 as well as defines the shape or form of the mouse 50. With regards to the unibody design, the mouse housing 52 includes a base 54 and a movable button body 56. The base 54, which defines the lower portion of the mouse, provides a structure for supporting the various components of the mouse as well as for making moving contact with a surface such as a desktop or mouse pad. By way of example, the base 54 may support a trackball mechanism or an optical sensor so as to track the position of the mouse 50 as it is moved along the surface. The base may also support printed circuit boards (PCB), processors, transmitters, encoders, indicators, and the like.

Figure 2A:
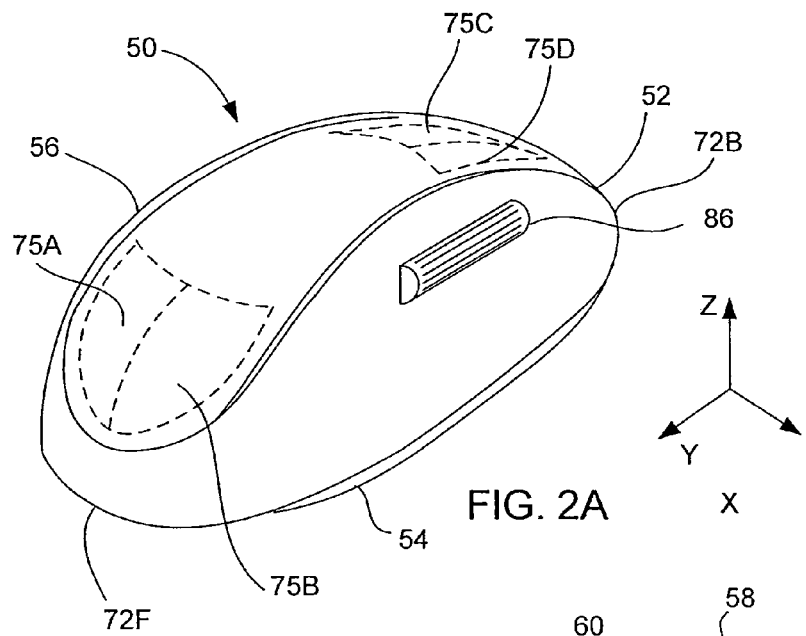
FIG. 2A is perspective diagram of a unibody ambidextrous mouse, in accordance with one embodiment of the present invention.
Figure 2B:
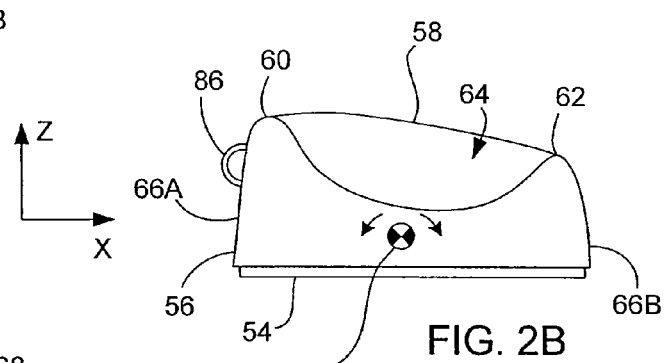
FIG. 2B is front or back view of the unibody ambidextrous mouse shown in FIG. 2A, in accordance with one embodiment of the present invention.

The movable button body 56, which defines the upper portion of the mouse 50, provides a structure for moving the mouse 50 along a surface, for gripping the mouse 50 for movement thereof and for implementing the button functions of the mouse 50. Since the mouse 50 is ambidextrous, the button body 56 is configured to receive either a right or left hand 51R and 51L (e.g., ambidextrous). As shown in FIG. 2B, the lateral shape of the button body 56 is asymmetric. This is generally done to provide ergonomic comfort to the asymmetric hand 51 whether right or left. With regards to the asymmetric lateral shape, the top side 58 of the body 56 includes a slope that tapers from a high point 60 to a low point 62 thus enabling the hand 51 to curve over the body in a natural manner (See FIG. 2G). The top side 58 that defines slope may be widely varied. For example, it may be rectilinear, curvilinear or both. The top side 58 may also be substantially convex (protrudes outwardly), concave (protrudes inwardly) or flat. In FIG. 2B, the top side 58 has a convex shape. The lateral sides 66 of the body 56 may be varied similarly to the top side 58 of the body 56 although the lateral sides 66 are substantially vertical as compared to the horizontal top side 58. The lateral sides 66 are generally configured to receive the thumb and the outermost finger or fingers during use (See FIG. 2G). In some cases, at least the thumb lateral side has a concave shape thus creating a thumb cove for receiving the thumb during use of the mouse 50

Figure 2C:
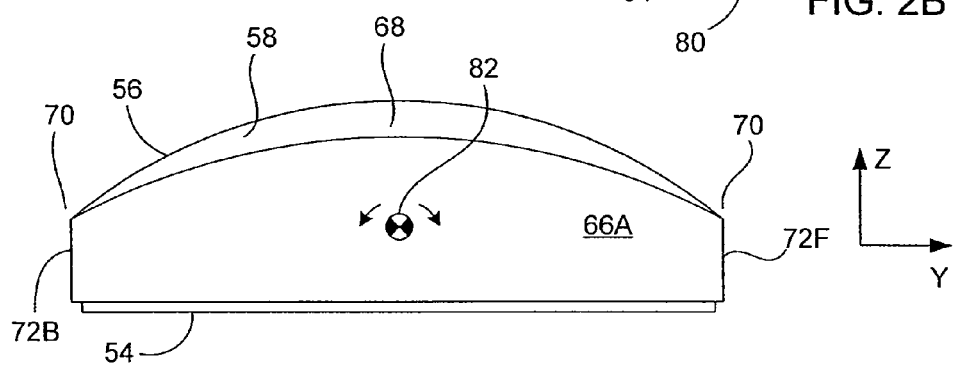
FIG. 2C is right side view of a unibody ambidextrous mouse shown in FIG. 2A, in accordance with one embodiment of the present invention.
Figure 2D:
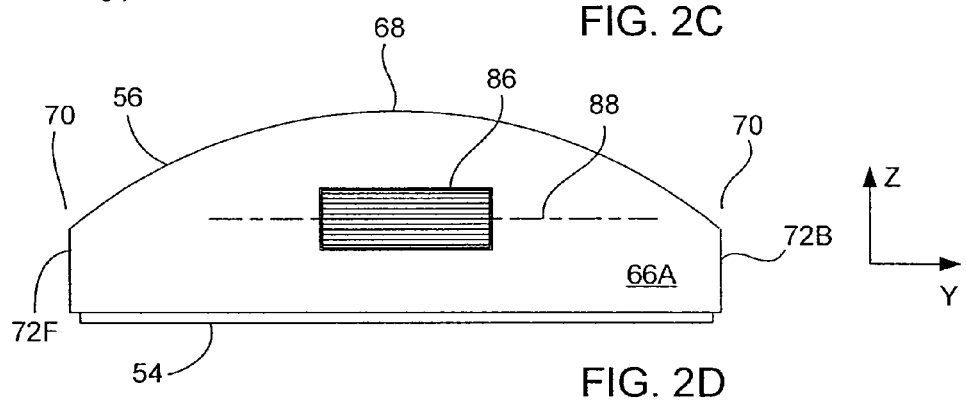
FIG. 2D is a left side view of a unibody ambidextrous mouse shown in FIG. 2A, in accordance with one embodiment of the present invention.
Figure 3A:
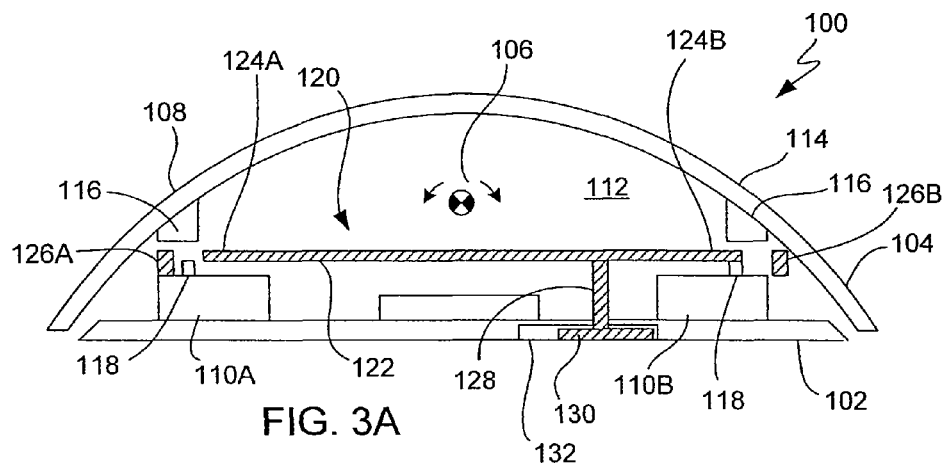
FIG. 3A is a side elevation view, in cross section of a mouse, in accordance with one embodiment of the present invention.
Figure 3B:
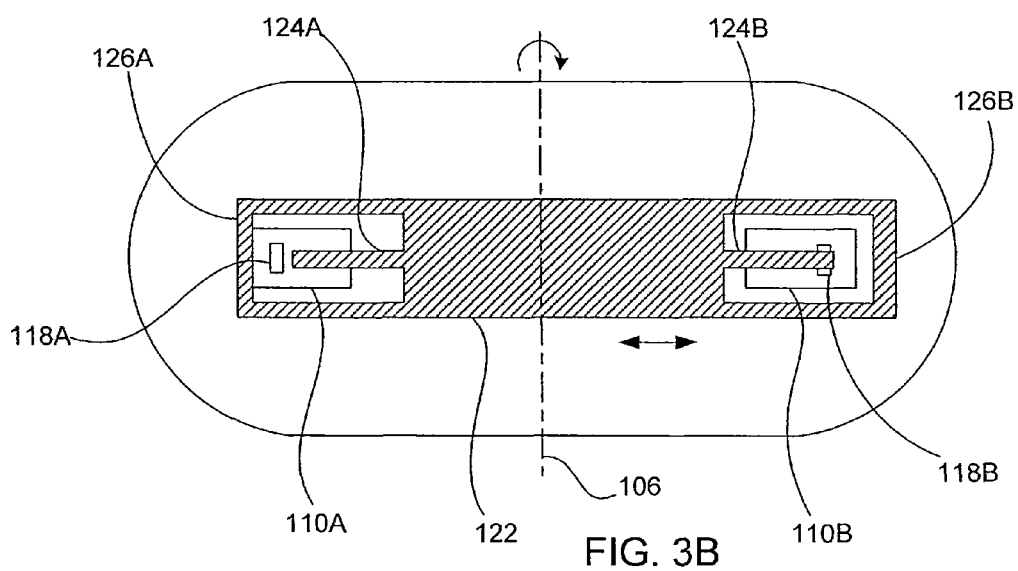
FIG. 3B is a top view of the mouse shown in FIG. 3A, in accordance with one embodiment of the present invention.
Figure 3C:
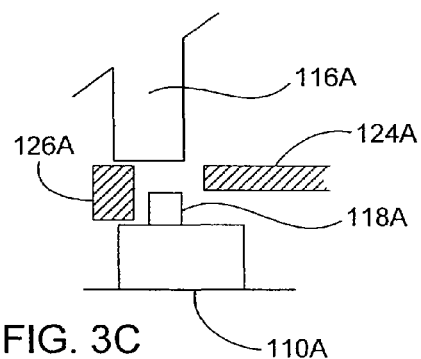
FIG. 3C is a broken away side elevation view, in cross section of the mouse shown in FIG. 3A, in accordance with one embodiment of the present invention.
Figure 3D:
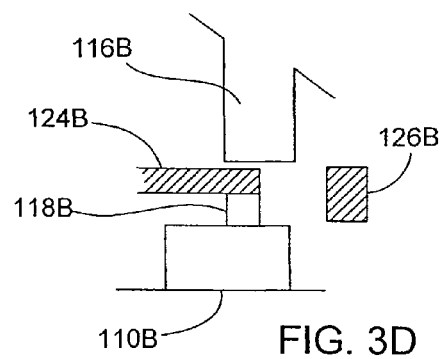
FIG. 3D is a broken away side elevation view, in cross section of the mouse shown in FIG. 3A, in accordance with one embodiment of the present invention.

Unlike the lateral shape, the longitudinal shape of the button body 56 as shown in FIG. 2C and 2D is symmetric. This allows the mouse 50 to be used by either hand 51R or 51L (ambidextrous). With regards to the symmetric longitudinal shape, the top side 58 of the body 56 is convex as shown in FIGS. 2C and 2D. That is, it equally slopes from a high point 68 to a low point 70 on both the front and back sides 72F and 72B of the mouse 50 thus enabling the hand 51 to curve over the body 56 in a natural manner (See FIGS. 2E and 2F). The mouse 50 may be rotated about the vertical axis by 180 degrees to change usage from right handed to left handed or vice versa (See FIGS. 2E and 2F).

Because the mouse 50 is a unibody mouse, the button body 56 is configured to move relative to the base 54. The portions of the body 56 that move generally take the form of button zones 75 that represent regions of the body 56 that may be pressed on to implement one or more button functions. The movement of the body 56 relative to the base 54 may be provided through one or more degrees of freedom (DOF). The degrees of freedom may be implemented through one or more rotations, pivots, translations, flexes relative to the base 54. By way of example, the button body 56 may be coupled to the base 54 via one or more pin joints, slider joints, ball and socket joints, flexure joints and/or the like. In addition, the mouse may include combinations such as pivot/translating joint, pivot/flexure joint, pivot/ball and socket joint, translating/flexure joint, a flexure joint, a ball and socket joint, and the like.

In the illustrated embodiment, the mouse 50 includes a pair of button zones 75 on both the front and back side 72F and 72B of the mouse 50. The button zones 75A and 75B on the front side 72F are used by right handed users and the button zones 75C and 75D on the back side 72B are used for left handed users. As should be appreciated, the pair of button zones may provide a right and left click similar to that of conventional mice. In order to provide this configuration of button zones 75, the body 56 is configured to have four movements: front left tilt, front right tilt, back left tilt, and back right tilt. In order to provide these movements, the body 56 is configured to pivot in two directions relative to a base 54. As shown by the arrows, the body 56 can pivot about a first axis 80 and a second axis 82. The positions of the two axis 80, 82 may be widely varied so long as they allow the four movements described above. In the illustrated embodiment, the two axes 80, 82 are orthogonal (or perpendicular) to one another and centrally located relative to the mouse 50. As such, the shape of the button zones 75A-D are somewhat similar.

During right handed use, the body 56 is capable of moving between an initial position (no pivot) and a left tilt position (pivot about both axis) when a force is applied to a left front portion 75B of the body 56 and between an initial position and a right tilt position (pivot about both axis) when a force is applied to a right front portion 75A of the body 56. During left handed use, the body 56 is capable of moving between an initial position (no pivot) and a left tilt position (pivot about both axis) when a force is applied to a left back portion 75C of the body 56 and between an initial position and a right tilt position (pivot about both axis) when a force is applied to a right back portion 75D of the body 56. The force may be any downward force on the mouse 50, whether from a finger, palm or hand. The button body 56 may be spring biased so as to place the button body 56 in the initial position.

The button functions of the button zones 75A-D are implemented via actuators located underneath the button zones 75A-D. The actuators may be any combination of switches and sensors. Switches are generally configured to provide pulsed or binary data such as activate (on) or deactivate (off). The sensors, on the other hand, are generally configured to provide continuous or analog data. In one implementation, when the user presses on the particular button zone 75 an underside portion of the body 56 is configured to contact or engage (and thus activate) a switch located underneath the particular button zone 75. By way of example, the switch may correspond to a tact switch. In another implementation, when a user presses on the button zone 75 one or more sensors are configured to monitor the pressure exerted by the finger(s) on the surface of the mouse 50 proximate the button zone 75 as well as the position of the finger(s) on the surface of the mouse 50 proximate the button zone 75. By way of example, the sensors may be capacitance sensors. These and other embodiments will be described in greater detail below.

In addition to buttons 75, the mouse 50 includes a wheel 86 configured to generate a control function when rotated. In general, the wheel 86 is arranged to rotate around an axis 88 in order to implement the control function. The position of the wheel 86 relative to the mouse housing 52 may be widely varied. For example, the wheel 86 may be placed at any external surface of the mouse housing 52 that is accessible to a user during manipulation of the mouse 50 (e.g., top, side, front, or back). In the illustrated embodiment, the wheel 86 is positioned on the side 66A of the body 56 in a location proximate the middle of the mouse 50 (e.g., between the front and back 72F and 72B) so that it can receive the thumb of either hand (e.g., left or right) when the hand 51 is placed on the top side 58 of the mouse 50. When the thumb is received, the thumb may be used to rotate the wheel 86 in order to generate the control function. As should be appreciated, this position allows ambidextrous use.

The wheel 86 may be widely varied. For example, the wheel 86 may be configured to rotate about a horizontal (e.g., X or Y) or vertical axis (e.g., Z). Furthermore, the wheel 86 may protrude outwardly from the housing 52, be flush with the housing 52 or it may even be recessed within the housing 52. In the embodiment of FIG. 2, the wheel 86 protrudes from housing 52 thus making it easily accessible to a user's thumb. The wheel 86 also rotates about the Y axis so that the thumb can be moved up and down along the side of the mouse in order to operate the scroll wheel (e.g., moving forwards to back in the case of the X and Z axis is generally more difficult to manage with the thumb). The wheel 86 may also include tactile features 90, which provide tangible surfaces that help the user manipulate the wheel 86 (e.g., knurl). Although not shown, the wheel 86 may further include a clicking action that inform the user of its rotatable position during rotation thereof. Another example of a wheel 86 which may be used can be found in commonly owned patent application Ser. No. 10/060,712, which is herein incorporated by reference.

The control function initiated by the wheel may be widely varied. The control function may be implemented incrementally or continuously during rotation of the wheel 86. For example, the control function may be used to control various applications associated with the computer system to which the mouse is connected. The control function may correspond to a scrolling feature. The term "scrolling" as used herein generally pertains to moving displayed data or images (e.g., text or graphics) across a viewing area on a display screen so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen or it may only be a portion of the display screen (e.g., a window frame).

The direction of scrolling may be widely varied. For example, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area. The scrolling feature may also be used to move a Graphical User Interface (GUI) vertically (up and down), or horizontally (left and right) in order to bring more data into view on a display screen. By way of example, the scrolling feature may be used to help perform internet browsing, spreadsheet manipulation, viewing code, computer aided design, and the like. The direction that the wheel 86 rotates may be arranged to control the direction of scrolling. For example, the wheel 86 may be arranged to move the GUI vertically up when rotated counterclockwise, and vertically down when the rotated clockwise (or vice versa).

FIGS. 3A-3D are diagrams of a unibody mouse 100, in accordance with one embodiment of the present invention. By way of example the mouse may correspond to any of the mice previously described. The mouse generally includes a base 102 and a button body 104. The button body 104 is pivotally coupled to the base 102 about an axis 106. As such, the button body 104 may pivot forwards in order to actuate a first button zone or backwards to actuate a second button zone. When pivoted forward, a front portion 108 of the button body 104 engages a first switch 110A located within the space 112 defined by the base 102 and the button body 104. When pivoted backwards, a back portion 114 of the button body 104 engages a second switch 110B located within the space 112 defined by the base 102 and button body 104. More particularly, nubs 116 of the button body 104 contacts an actuator 118 that protrudes from the switches 110. When the actuator 118 is pushed down, the switch 110 is configured to generate a control signal. The first switch 110A generates a first control signal associated with the first button zone and the second switch 110B generates a second button signal associated with the second button zone. Both switches 110 are typically attached to the base 102.

The mouse 100 further includes a button zone selection mechanism 120 for configuring the button zones of the mouse 100. The mechanism 120 allows the user to activate and/or deactivate the button zones 100. This particular feature is advantageous in ambidextrous mice where it would be beneficial to turn off right handed button zones when using the mouse as a left handed mouse and to turn off left handed button zones when using the mouse as a right handed button. In the illustrated embodiment, the mechanism 120 is configured to activate one of the button zones while deactivating the other button zone. The mechanism generally includes a shuttle plate 122 that translates relative to the base 102 or button body 104. In FIG. 3, the shuttle plate 122 is slidably coupled to the base 102. The shuttle plate 122 includes a first cantilever 124A and a second cantilever 124B, which are disposed at opposing ends of the shuttle plate 122. The shuttle plate 122 additionally includes first and second abutment stops 126A and 126B disposed at opposing ends of the shuttle plate 122. As shown, the cantilevers 124 are spatially separated from the abutment stops 126 thereby forming voids therebetween.

The cantilevers 124 and abutment stops 126 are configured to slide between the switches 110 and the nubs 116 on each side of the mouse 100. In order to turn off a button zone, the abutment stop 126 is slid between the housing of the switch 110 and the nub 116. The abutment stop 126 therefore prevents the nub 116 from contacting the actuator 118 when the corresponding button zone is selected. That is, the abutment stop 126 stops the motion of the nub 116 before it reaches the actuator 118. Because the actuator 118 cannot be contacted, no control signals can be generated and thus the button zone is deactivated. In order to activate a button zone, the cantilever 124 is slid between the nub 116 and the actuator 118. The cantilever 124 is an intermediate member that is capable of transmitting motion from the nub 116 to the actuator 118 of the switch 110. Because the actuator 118 may be actuated via the nub/cantilever 116/124, control signals can be generated and thus the button zone is activated.

To elaborate further, the shuttle plate 122 is connected to a support arm 128 and the support arm 128 is connected to a user actuated switch 130. The switch 130 is configured to move between a first position and a second position and the support arm 128 is configured to transmit the motion of the switch 130 to the shuttle plate 122. The switch 130 can therefore be used to slide the shuttle plate 122 to its various locations within the mouse 100 in order to activate and deactivate the button zones. In the illustrated embodiment, the switch 130 is capable of moving the shuttle plate 122 relative to both switches 110 and both nubs 116 so that the shuttle plate 122 turns off one of the button zones while turning on the other button zone. That is, the user simply moves the switch 130 to a the first position in order to activate the first button zone and deactivate the second button zone, and to the second position in order to activate the second button zone and deactivate the first button zone. For example, when the switch 130 is moved to the first position, the support arm 128 causes the shuttle plate 122 to translate towards the front of the mouse 100 thereby placing the abutment stop 126A between the nub 116A and the housing of switch 110A and the cantilever 124B between the actuator 118B and the nub 116B. Furthermore, when the switch 130 is moved to the second position, the support arm 128 causes the shuttle plate 122 to translate towards the back of the mouse 100 thereby placing the abutment stop 126B between the nub 116B and the housing of switch 110B and the cantilever 124A between the actuator 118A and the nub 116A.

The mechanism may be widely varied. For example, the components may be integrally formed as a unit or they may be separate components that work together (e.g., linkage). Furthermore, the components may be substantially free moving or they may be movably restrained. For example, the shuttle plate 122 may move within a guide formed by the base or body. Moreover, the switch 130 may be configured to translate, or rotate in order to move the shuttle plate. In the illustrated embodiment, the switch 130 translates within a recess 132 formed in the bottom side of the base 102. The recess 132 is generally longer than the switch 130 so that the switch 130 can be slid therein. In most cases, the switch 130 is recessed within the bottom side of the base 102 so that the switch 130 won't protrude therefrom. As should be appreciated, the bottom side of the base 102 is generally moved along a surface and therefore any protrusions would impede its motion or cause unwanted switches. In some cases, the switch 130 may include tactile surfaces such as a knurled surface.

Figure 4:
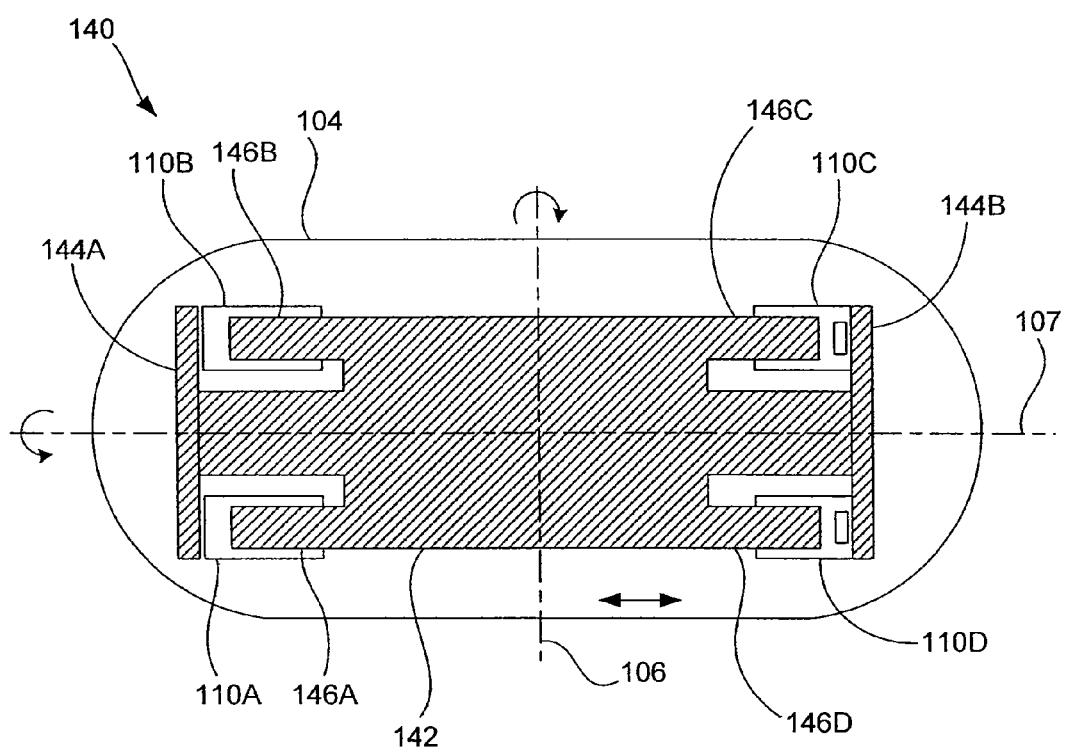
FIG. 4 is a top view of a mouse, in accordance with another embodiment of the present invention.

FIG. 4 is top view of a unibody mouse 140, in accordance with an alternate embodiment of the present invention. Unlike the unibody mouse of FIG. 3 that includes two button zones, the unibody mouse of FIG. 4 includes four button zones. In this embodiment, the button body 104 is configured to pivot about two axis 106 and 107 in order to cause a front tilt right, front tilt left, back tilt right and back tilt left. Each tilt causes the body 104 to contact one of four switches 110A-D in a manner similar to that described above. In this embodiment, the shuttle plate 142 includes an abutment stop 144 and a pair of cantilevers 146 on each side. Each of the cantilevers 146 corresponds to a different switch 110 while the abutment stops 144 each correspond to the switches 110 on each side of the mouse 100. As such, when the shuttle plate 142 translates towards the front of the mouse 140 the abutment stop 144B is placed between the nub (not shown) and the housing of switches 110C and 110D thereby deactivating the button zones in the back of the mouse 140, and the pair of cantilevers 146A and 146B are placed between the nub and actuator 118 of switches 110A and 110B thereby activating the button zones in the front of the mouse 140. Furthermore, when the shuttle plate 142 translates towards the back of the mouse 140 the abutment stop 144A is placed between the nub and housing of switches 110A and 110B thereby deactivating the button zones in the front of the mouse, and the pair of cantilevers 146C and 146D are placed between the nub and the actuator 118 and of switches 110C and 110D thereby activating the button zones in the back of the mouse 140.

Figure 5:
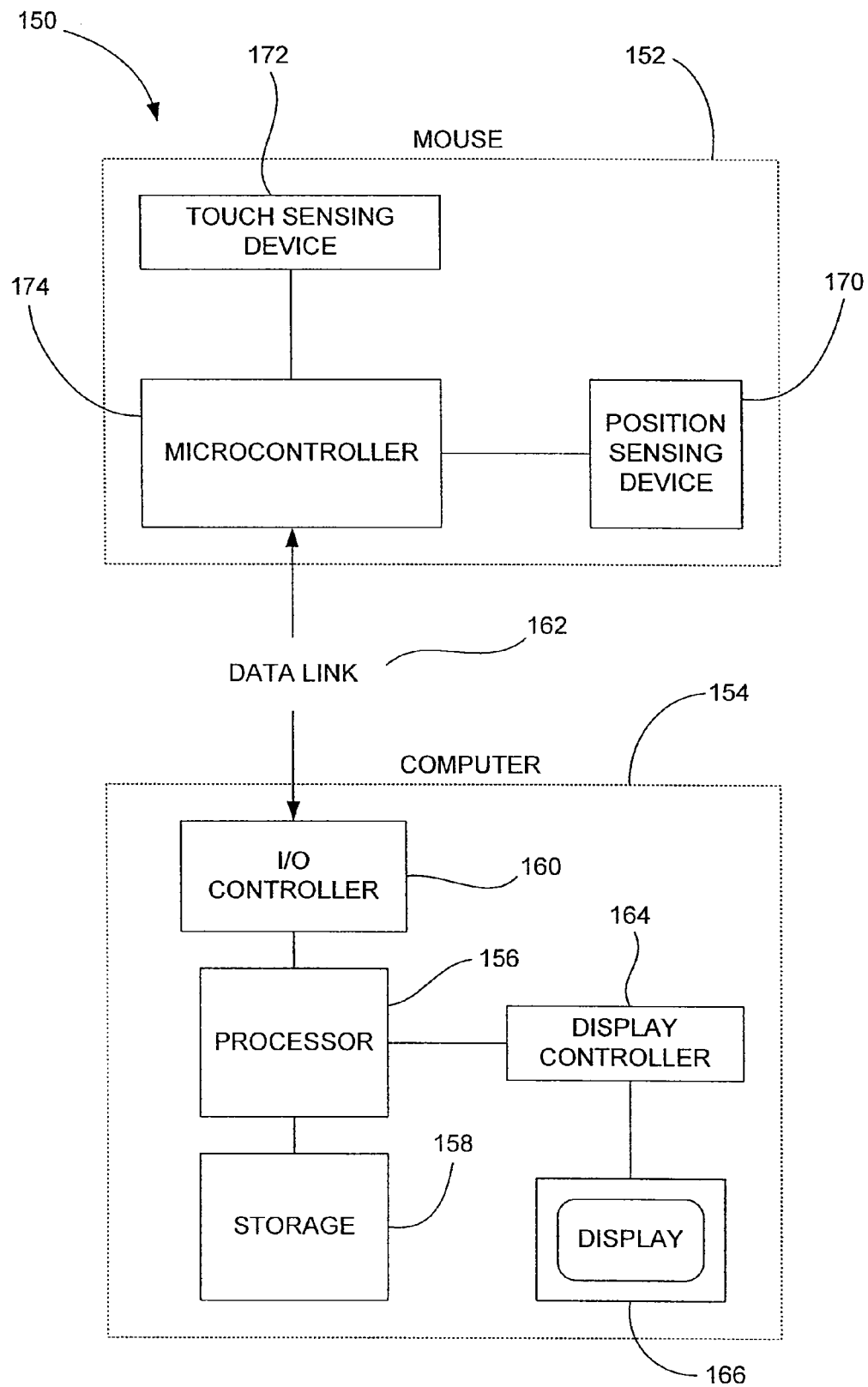
FIG. 5 is block diagram of a computer system, in accordance with one embodiment of the present invention.

FIG. 5 is a block diagram of a computing system 150, in accordance with one embodiment of the present invention. The system 150 includes a mouse 152 and a computer 154, including but not limited to, a desktop computer, lap top computer, hand held computer, and the like. By way of example, the computer 154 may correspond to any Apple or PC based computer. The computer 154 generally includes a processor 156 configured to execute instructions and to carry out operations associated with the computer system 150. For example, using instructions retrieved for example from memory, the processor 156 may control the reception and manipulation of input and output data between components of the computing system 150. The processor 156 can be a single-chip processor or can be implemented with multiple components.

In most cases, the processor 156 together with an operating system operates to execute computer code and produce and use data. The computer code and data may reside within a program storage 158 block that is operatively coupled to the processor 156. Program storage block 158 generally provides a place to hold data that is being used by the computer system 150. By way of example, the program storage block 158 may include Read-Only Memory (ROM), Random-Access Memory (RAM), hard disk drive and/or the like. The computer code and data could also reside on a removable program medium and loaded or installed onto the computer system when needed. Removable program mediums include, for example, CD-ROM, PC-CARD, floppy disk, magnetic tape, and a network component.

The computer 154 also includes an input/output (I/O) controller 160 that is operatively coupled to the processor 156. The (I/O) controller 160 may be integrated with the processor 156 or it may be a separate component as shown. The I/O controller 160 is generally configured to control interactions with one or more I/O devices (e.g., mouse 152) that can be coupled to the computer 154. The I/O controller 160 generally operates by exchanging data between the computer 154 and the I/O devices that desire to communicate with the computer 154. The I/O devices and the computer 154 typically communicate through a data link 162. The data link 162 may be a one way link or two way link. In some cases, the I/O devices may be connected to the I/O controller 160 through wired connections. In other cases, the I/O devices may be connected to the I/O controller 160 through wireless connections. By way of example, the data link 162 may correspond to PS/2, USB, IR, RF, Bluetooth or the like.

The computer 154 also includes a display controller 164 that is operatively coupled to the processor 156. The display controller 164 may be integrated with the processor 156 or it may be a separate component as shown. The display controller 164 is configured to process display commands to produce text and graphics on a display device 166. The display device 166 may be integral with the computer or it may be a separate component of the computer 154. By way of example, the display device may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The mouse 152, on the other hand, generally includes a position sensing device 170 and a touch sensing device 172, both of which are operatively coupled to a microcontroller 174. The position sensing device 170 is configured to generate tracking signals when the mouse 152 is moved along a surface. The tracking signals may be used to control the movement of a pointer or cursor on the display screen 166. The tracking signals may be associated with a Cartesian coordinate system (x and y) or a Polar coordinate system (r, θ). By way of example, the position sensing device 170 may correspond to a conventional trackball or optical assembly.

The touch sensing device 172 is configured to generate hand signals when the hand is positioned over or on the mouse 152. The hand signals may be used to initiate button functions or to make a determination as to which user is using the mouse 152. By way of example, the button functions may include moving an object on the display screen, selecting an item on the display screen, opening a file or document, launching a program, executing instructions, viewing a menu on the display screen, and/or the like. The button functions may also include functions associated with keyboard related actions such as enter, delete, insert, page up/down, and the like. The button functions may further include gesturing. With regards to the determination, the user may correspond to the identity of the user (e.g., Bob or Carol) or to a type of user (e.g., left or right handed user). These and other embodiments will be described in greater detail below.

The touch sensing device 172 generally includes one or more sensors for detecting the proximity of the finger thereto and/or the pressure exerted thereon. By way of example, the sensors may be based on resistive sensing, surface acoustic wave sensing, pressure sensing (e.g., strain gauge), optical sensing, capacitive sensing and the like. Depending on the type of sensor used, the hand signals may be in the form of position signals as for example when the sensors are set up in a grid or pixilated format. In one particular embodiment, the touch sensing device uses capacitance sensors. As should be appreciated, whenever two electrically conductive members come close to one another without actually touching, their electric fields interact to form capacitance. In one configuration, the first electrically conductive member is one or more electrodes or wires and the second electrically conductive member is the finger of the user. Accordingly, as the finger approaches the surface of the mouse, a tiny capacitance forms between the finger and the electrodes/wires in close proximity to the finger. The capacitance in each of the electrodes/wires is measured by the microcontroller 174. By detecting changes in capacitance at each of the electrodes/wires, the microcontroller 174 can determine the user type and button selections when the finger or palm is placed on the mouse 152.

The microcontroller 174 is configured to acquire the data from the sensing devices 170 and 172 and to supply the acquired data to the processor 156 of the computer 154. In one embodiment, the microcontroller 174 is configured to send raw data to the processor 156 so that the processor 156 processes the raw data. For example, the processor 156 receives data from the microcontroller 174 and then determines how the data is to be used within the computer system 152. In another embodiment, the microcontroller 174 is configured to process the raw data itself. That is, the microcontroller 174 reads the pulses from the sensors of the sensing devices 170 and 172 and turns them into data that the computer 154 can understand. By way of example, the microcontroller 174 may place the data in a HID format (Human Interface Device). The microcontroller 174 may also convert the acquired signals into other forms of signals before sending them to the processor 156. For example, the microcontroller 174 may convert hand signals into button signals. With regards to button signals, the microcontroller 174 may set the distribution of button zones. The button zones generally represent a more logical range of user inputs than the sensors themselves. The microcontroller 174 may also be used to perform user type recognition, i.e., recognizes if the mouse is being used as a right or left hand by distinguishing fingers and palm of hand. The microcontroller 174 typically includes an application specific integrated circuit (ASIC) that is configured to monitor the signals from the sensing devices 170 and 172, to process the monitored signals and to report this information to the processor (e.g., x, y, button, left, right, etc.). By way of example, this may be implemented through Firmware.

In one embodiment, program storage block 158 is configured to store a mouse program for controlling information from the mouse 152. Alternatively or additionally, a mouse program or some variation thereof may be stored in the mouse 152 itself (e.g., Firmware). The mouse program may contain hand profiles associated with hand actions. The hand profiles generally describe how the mouse 152 is held while the hand actions describe what type of action to perform based on the hand profile. In one implementation, the hand profiles may be accessed by a user through a hand menu, which may be viewed on the display device as part of a GUI interface. The hand menu may include hand settings pertaining to the hand profiles and hand actions. In fact, the hand menu may serve as a control panel for reviewing and/or customizing the hand settings, i.e., the user may quickly and conveniently review the hand settings and make changes thereto. Once changed, the modified hand settings will be automatically saved and thereby employed to handle future mouse processing. The hand menu may also be used as part of a training sequence for training the mouse 152 to a particular user type.

Figure 6:
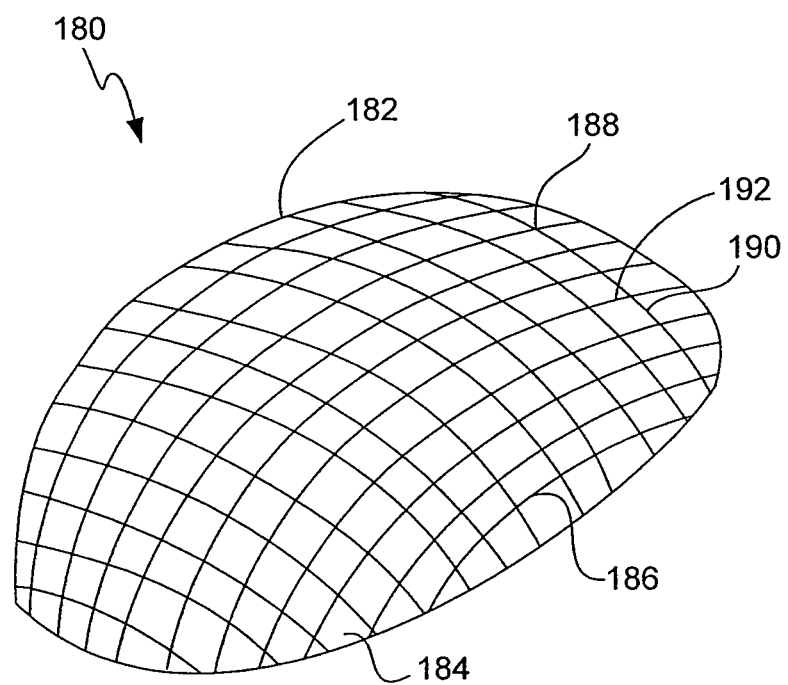
FIG. 6 is a perspective diagram of a touch sensitive mouse, in accordance with one embodiment of the present invention.
Figure 7B:
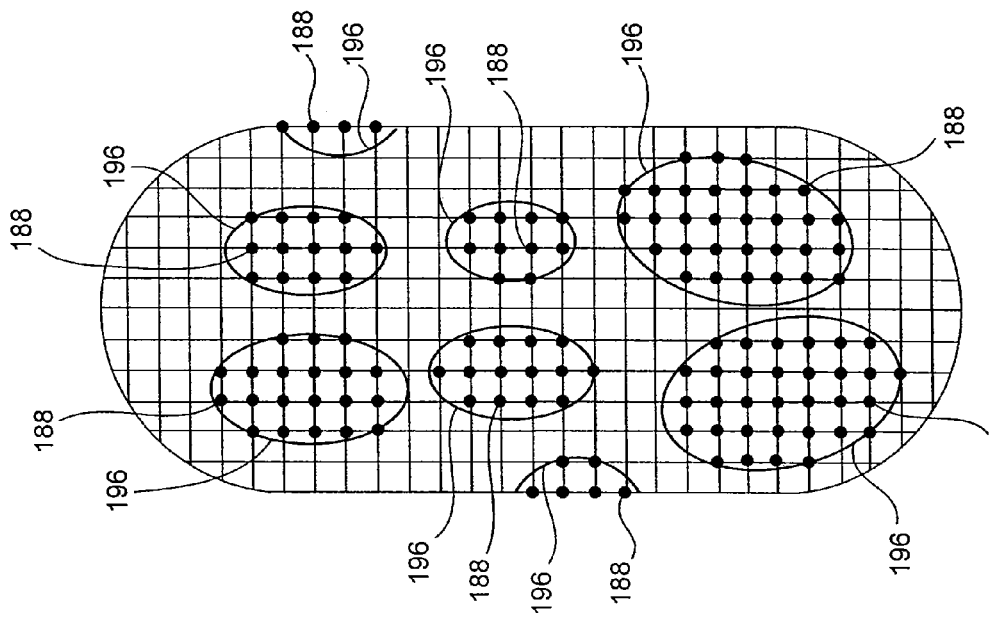
FIG. 7B is a top view of the touch sensitive mouse of FIG. 6 producing a second hand signal, in accordance with one embodiment of the present invention.
Figure 7A:
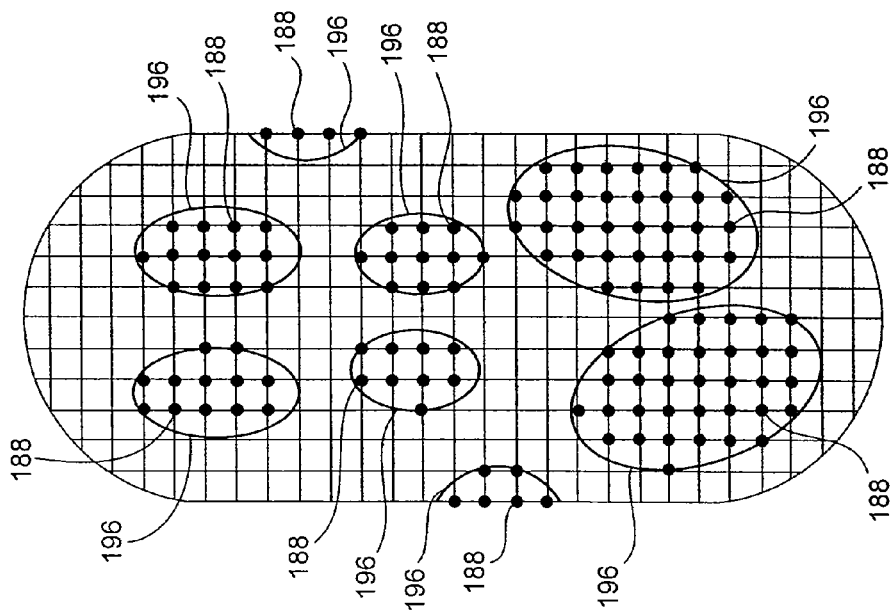
FIG. 7A is a top view of the touch sensitive mouse of FIG. 6 producing a first hand signal, in accordance with one embodiment of the present invention.

FIG. 6 is a perspective diagram of a touch sensitive mouse 180, in accordance with one embodiment of the present invention. The touch sensitive mouse 180 includes a touch sensitive surface 182 that senses surface contact so that the mouse 180 (or host) knows where and when the fingers and palm are touching the mouse 180 and how much pressure there is at each point. The touch sensitive surface 182 is generally provided by the mouse housing 184 and a sensor arrangement 186. The sensor arrangement 186 may be integrally formed into the wall of the mouse housing 184 or they may be located behind the wall within the enclosed space defined by the mouse housing 184 (e.g., adjacent the interior wall). The sensor arrangement 186 is configured to detect the presence of an object such as a finger or palm of the hand as for example when the hand grasps the mouse housing 184. The sensor arrangement 186 may also detect the pressure being exerted on the mouse by the finger or palm of the hand. By way of example, the sensor arrangement 186 may be based on resistive sensing, surface acoustic wave sensing, pressure sensing (e.g., strain gauge, pressure plates, piezoelectric transducers or the like), heat sensing, optical sensing, capacitive sensing and/or the like.

As shown, the sensor arrangement 186 is divided into several independent and spatially distinct sensing points (or regions) 188 that are positioned around the periphery of the mouse 180. The sensing points 188 are generally dispersed about the mouse 180 with each sensing point 188 representing a different position on the surface of the mouse 180. The sensing points 188 may be positioned in a grid or a pixel array where each pixilated sensing point 188 is capable of generating a signal. The number and configuration of the sensing points 188 may be widely varied. The number and configuration of sensing points 188 generally depends on the desired resolution of the touch sensitive surface 182. In the simplest case, a signal is produced each time the finger is positioned over a sensing point 188. When an object is placed over multiple sensing points 188 or when the object is moved between or over multiple sensing points 188, multiple position signals are generated. In most cases, the signals are monitored by a control system (not shown) that converts the number, combination and frequency of the signals into control information. As should be appreciated, the number, combination and frequency of signals in a given time frame may indicate size, location, direction, speed, acceleration and the pressure of the finger or palm on the mouse 180. By way of example, the control system may be a microcontroller located on the mouse and/or a processor of a host device such as a computer.

In the illustrated embodiment, the sensing points 188 are based on capacitance. As should be appreciated, whenever two electrically conductive objects come near one another without touching, their electric fields interact to form capacitance. By detecting when the capacitance changes (e.g., increase, decreases) the mouse's electronics can determine when and where the finger and palm of the hand are touching. Any conventional form of capacitance sensing may be used, including but not limited to capacitive sensing methods as found in touch pads, key boards, and the like. The simplicity of capacitance allows for a great deal of flexibility in design and construction of the sensor arrangement (e.g., mutual capacitance sensing, capacitance to ground sensing, etc.).

In the illustrated embodiment, the sensor arrangement 186 includes a two layer grid of spatially separated electrodes or wires 190 and 192 that are connected to a microcontroller (not shown). The upper layer includes electrodes 190 in rows while the lower layer includes electrodes 192 in columns (e.g., orthogonal). As should be appreciated, when a portion of a hand nears the intersection of two electrodes 190 and 192, the capacitance at the electrodes 190 and 192 changes since the hand has very different dielectric properties than air. These changes can be used to determine the positions of the finger and/or palm when they grab the mouse 180. In some cases, the amount of capacitance to each of the electrodes 190 and 192 can be measured by the microcontroller when a portion of a hand nears the intersection of two electrodes 190 and 192 (e.g., sensing point). In other cases, capacitance from each of the row electrodes 190 to each of the column electrodes 192 can be measured by the microcontroller when a portion of a hand nears the intersection of two electrodes 190 and 192 (e.g., sensing point).

The signals generated at the sensing points 188 may be used to determine how the user is holding the mouse 180. By way of example and referring to FIGS. 7A and 7B, each portion of the hand in contact with the mouse produces a contact patch area 196. Each of the contact patch areas 196 covers several sensing points 188 thus generating several position signals. The position signals may be grouped together to form a hand signal that represents how the user is holding the mouse 180. In essence, the hand signal is a pixilated image of the hand in contact with the mouse 180. A first hand signal may be compared to a second hand signal to determine button selection or user type. For example, the hand signal generated in FIG. 7A may be compared to the hand signal generated in FIG. 7B. The first hand signal generally corresponds to the most current hand signal while the second hand signal generally corresponds to a previous hand signal. The previous hand signal may be an in use hand signal or a baseline hand signal that was preset or trained before use. In most cases, the in use hand signal is the last hand signal before the current hand signal.

In one embodiment, the difference between a current hand signal (FIG. 7A) and a last hand signal (FIG. 7B) may indicate the user's desire to implement a button function. As should be appreciated, when a user presses on the surface of the mouse the area of some of the contact patch areas 196 increases thereby activating more sensing points 188 than previously activated. A significant difference indicates the user's desire to implement a button function. Changes between contact patch areas may further indicate the particular button function.

In relative mapping, the difference at each particular contact patch area 196 is compared relative to the other particular contact patch areas 196. For example, if the contact patch area for the right finger grows more significantly than the contact patch area for the left finger between first and second signals then the particular button function may be a right click. Furthermore, if the contact patch area for the left finger grows more significantly than the contact patch area for the right finger between first and second signals then the particular button function may be a left click.

In absolute mapping, the mouse 180 includes one or more button zones that represent regions of the mouse 180 that when selected implement the particular button function associated with the button zone (e.g., right click, left click). The button zone having the contact patch area 196 with the most significant change between first and second hand signals is the one that is typically implemented. The user may customize the mouse 180 by setting the configuration of button zones before use. For example, the mouse 180 may be configured as a one button mouse, two button mouse, three button mouse or the like. The mouse 180 may also be configured with scrolling zones. The position and size of the button zones may also be customizable. For example, the mouse 180 may be configured with button zones on only the front or back of the mouse (e.g., left hand or right hand button) or on the side of the mouse (e.g., thumb button). The customization may be performed by the user and/or the mouse 180.

In another embodiment, the similarity between a baseline hand signal and a current hand signal may indicate the user's desire to implement a control function (e.g., gesturing). For example, if the baseline hand signal corresponds to a right click and the current hand signal is similar to the baseline hand signal then the mouse can implement a right click. The user may customize the mouse by setting the baseline lo hand signal before use (e.g., calibration).

In another embodiment, the similarity between a baseline hand signal and a current hand signal may also indicate the user type (e.g., handedness of the user or the identity of the user). For example, if the baseline hand signal corresponds to a left hand user and the current hand signal is similar to the baseline hand signal then the mouse knows that the user is left handed. The user may customize the mouse by setting the baseline hand signal before use (e.g., calibration).

Figure 8:
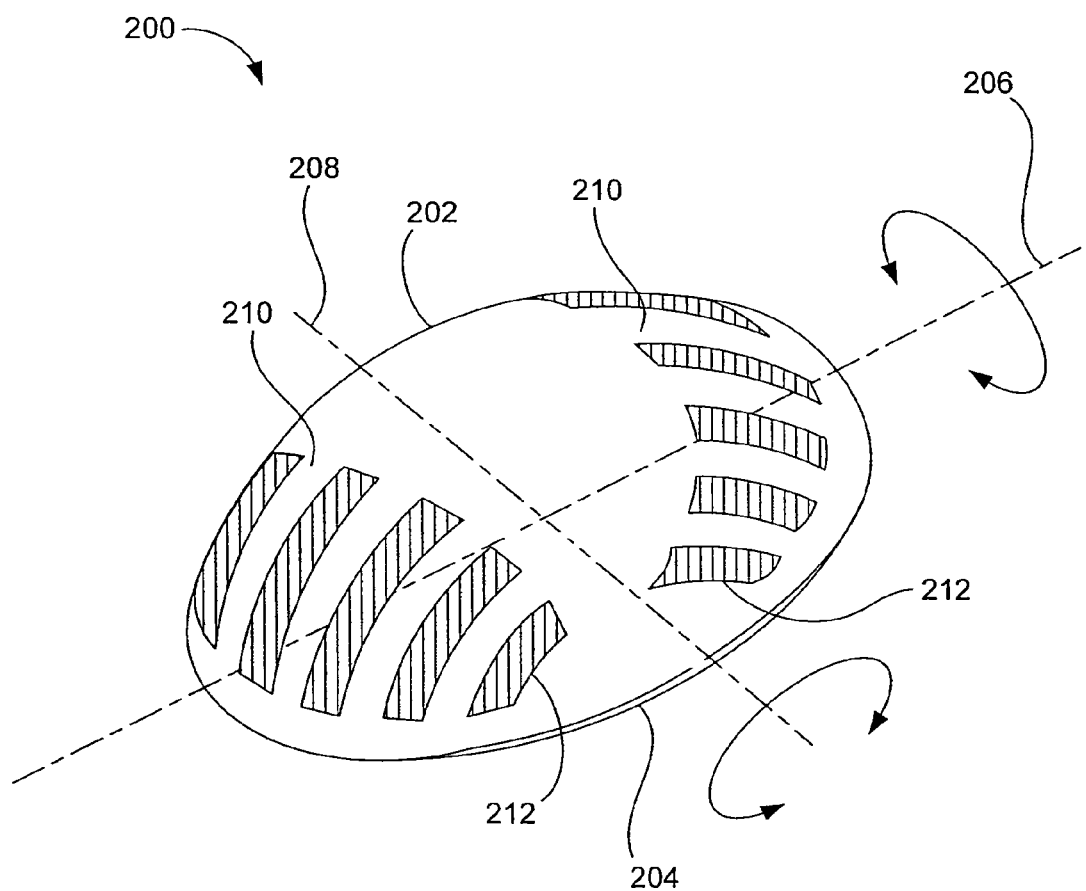
FIG. 8 is a perspective diagram of a mouse, in accordance with one embodiment of the present invention.

FIG. 8 is a perspective diagram of a mouse 200, in accordance with one embodiment of the present invention. As shown, the mouse 200 includes a body 202 that moves relative to base 204. In particular, the body 202 is capable of pivoting about a pair or axes 206 and 208. The pivoting nature allows for a plurality of tilting actions, i.e., a front right tilt, a front left tilt, a back right tilt and a back left tilt. The mouse 200 also includes a pair of capacitance sensing devices 210 located at the front and back of the mouse 200. The capacitance sensing devices 210 are configured to monitor a user's touch. Each of the capacitance sensing devices includes a plurality of electrodes 212 that generate signals when the hand nears the body 202.

The signals generated from the electrodes 212 may be used by the mouse to perform button functions as well as to determine the user type. For example, the electrodes 212 may generate a first group of signals for a right handed user and a second set of signals for a left handed user. As should be appreciated, right handed users typically place their fingers on the front and their palm on the back of the mouse while left handed users typically place their fingers on the back and the palm on the front of the mouse. Furthermore, the electrodes 212 may generate a different group of signals for each tilting action. These signals may be processed by the mouse system to determine what button function to implement for the tilting action. For example, when the mouse 200 is tilted to the front right, the signals may be used to generate a right click for a right handed user and when the mouse 200 is tilted to the front left, the signals may be used to generate a left click for a right handed user. Furthermore, when the mouse 200 is tilted to the back right, the signals may be used to generate a right click for a left handed user and when the mouse 200 is tilted to the back left, the signals may be used to generate a left click for a left handed user.

Because the mouse 200 does not produce a click for each tilt, it may include a tactile click generator electrically controlled for example using a solenoid actuator on the inside of the mouse housing. When the mouse (e.g., firmware) decides a click has been made, the plunger of the solenoid actuator taps a rib inside the mouse housing which provides tactile and audible feedback to the user (e.g., simulates a clicking action). A buzzer may also be used to give audio feedback.

It should be noted that a dual pivoting body is not a limitation. In some cases, the body may be configured to pivot about a single axis, i.e., pivoting about axis 206 is eliminated. In other cases, other movements other than pivoting may be implemented. Furthermore, the body may be configured to not move at all.

Figure 9:
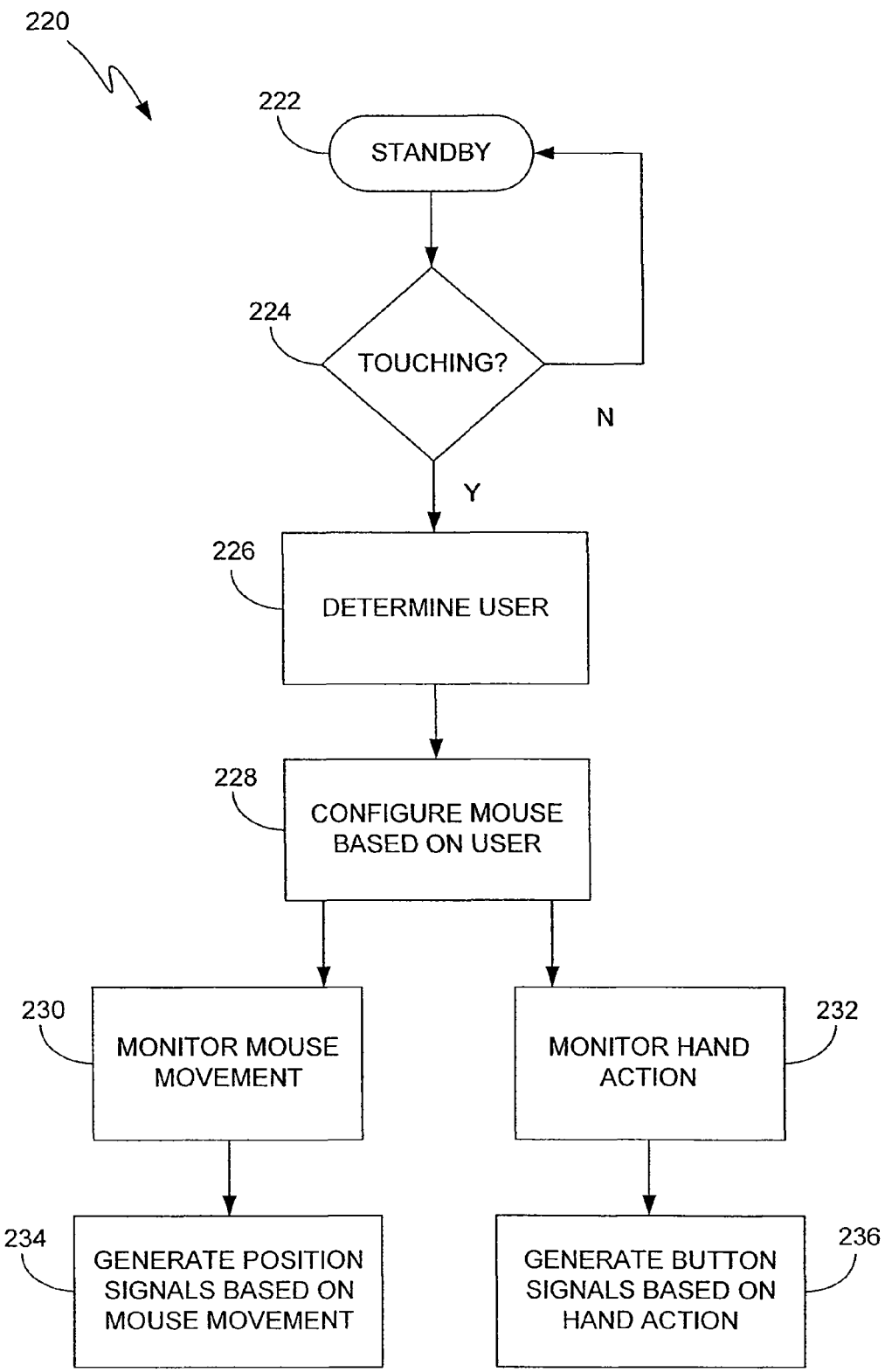
FIG. 9 is a mouse operational method, in accordance with one embodiment of the present invention.

FIG. 9 is a mouse operational method 220 in accordance with one embodiment of the present invention. By way of example the method 220 may be performed using the system shown in FIG. 5. The method 220 generally begins at block 222 where the mouse is in standby. Standby generally implies that the mouse is in a state of readiness waiting for something to happen, i.e., a user initiating an action therewith. Following block 222, the process flow proceeds to block 224 where a determination is made as to whether the user is touching the mouse. This is generally accomplished with touch sensing device capable of generating signals when a hand nears the mouse and a control system configured to monitor the activity of the touch sensing device. If it is determined that the user is not touching the mouse, then the process flow proceeds back to block 222 thereby keeping the mouse in standby. If it is determined that the user is touching the mouse, then the process flow proceeds to block 226 where the user is determined.

In one embodiment, block 226 includes determining the handedness of the user. In another embodiment, block 226 includes determining the actual user (e.g., Bob or Carol). The determination may be performed automatically or it may be selective, i.e., user initiated. Once the user is determined, the process flow proceeds to block 228 where the mouse is configured based on the user. In one embodiment, the motion axes of the mouse are configured based on the handedness of the user. In another embodiment, the button zones of the mouse are configured based on the handedness of the user. In other embodiments, the motion axes as well as the button zones are configured based on the actual user (e.g., Bob or Carol). The button zones may be based on relative mapping or absolute mapping.

Following block 228 the process flow proceeds to simultaneously occurring blocks 230 and 232. In block 230, the movement of the mouse is monitored. This may be accomplished with a position sensing device such as a track ball or optical sensor. In block 232, the hand action of the user is monitored. This may be accomplished by a touch sensing device that senses user touch and generates hand signals based on the user's touch. Following block 230, the process flow proceeds to block 234 where position signals are generated based on the mouse movement. For example, in the case of a Cartesian coordinate based system the position sensing device may generate X, Y signals. Following block 232, the process flow proceeds to block 236 where button signals are generated based on the hand action. For example a first hand signal may be compared to a second hand signal and differences or similarities therebetween can be used to determine what button signal to generate. After blocks 234 and 236, the position and button signals may be used to perform actions in a host system. For example, the position signals may be used to move a cursor and the button signals may be used to make selections in a graphical user interface.

Figure 10:
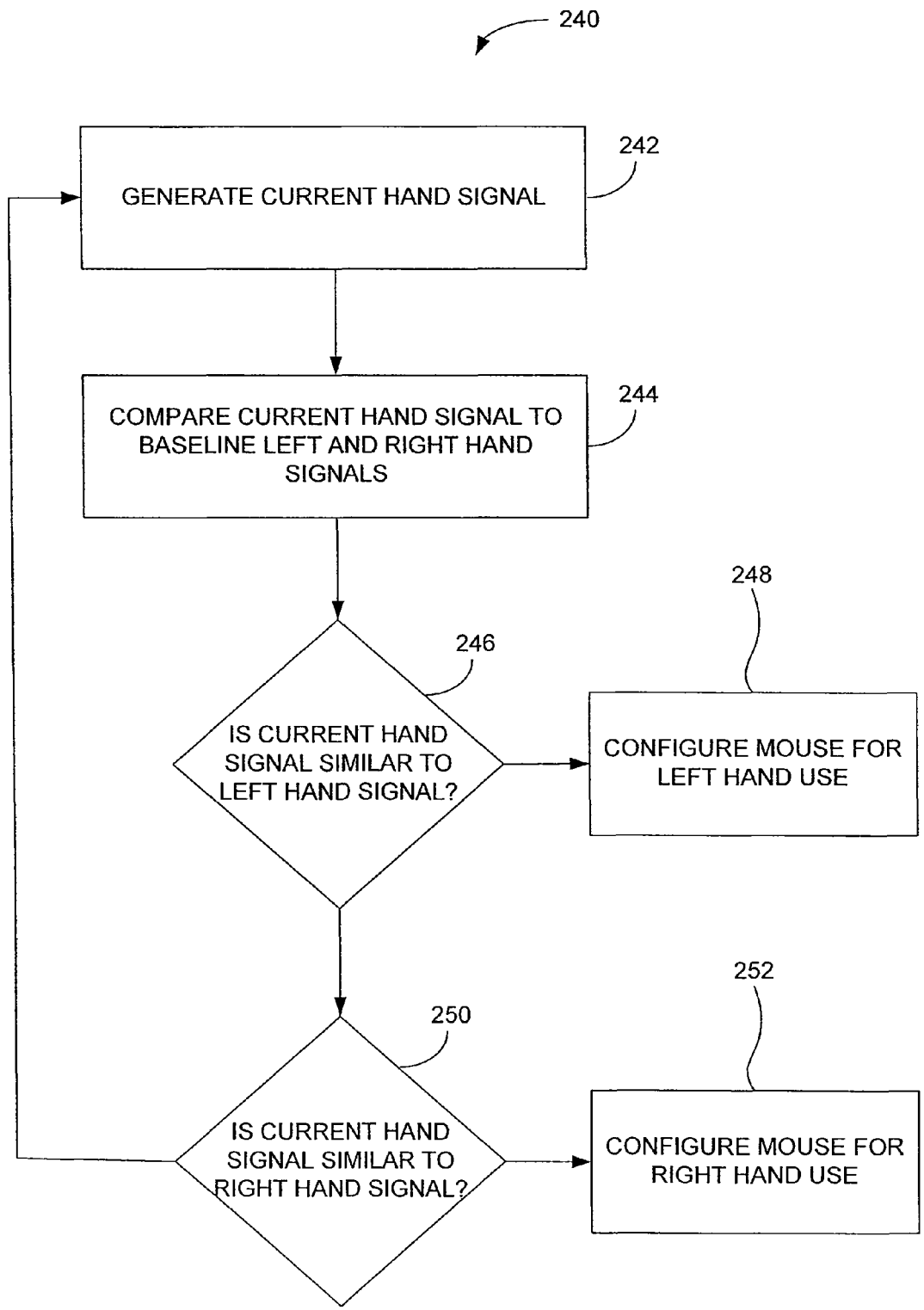
FIG. 10 is a handedness determination method, in accordance with one embodiment of the present invention.

FIG. 10 is a handedness determination method 240, in accordance with one embodiment of the present invention. By way of example, the method may be included in block 226 of FIG. 9. The method generally begins at block 242 where a current hand signal is generated. The hand signal is typically generated by a touch sensing device of the mouse. Following block 242 the process flow proceeds to block 244 where the current hand signal is compared to baseline left and/or right hand signals. This is typically accomplished by the mouse microcontroller (174), but it may also be processed by the host system (154) as well. Following block 244 the process flow proceeds to block 246 where a determination is made as whether the current hand signal is similar to the baseline left hand signal. Similar to the previous block, this may be accomplished by the mouse microcontroller (174) or the host system (154). If the current hand signal is similar, then the process flow proceeds to block 248 where the mouse is configured for left hand use. That is, the motion axes and button zones are set for the left handed user. If the current hand signal is not similar to the left hand profile, then the process flow proceeds to block 250 where a determination is made as to whether the current hand signal is similar to a baseline right hand signal. If the current hand signal is similar then the process flow proceeds to block 252 where the mouse is configured for right hand use. If the current hand signal is not similar to the right hand profile then the process flow proceeds back to block 242 or in some cases one configuration may be chosen as a default (e.g., right hand may be the default)

Figure 11:
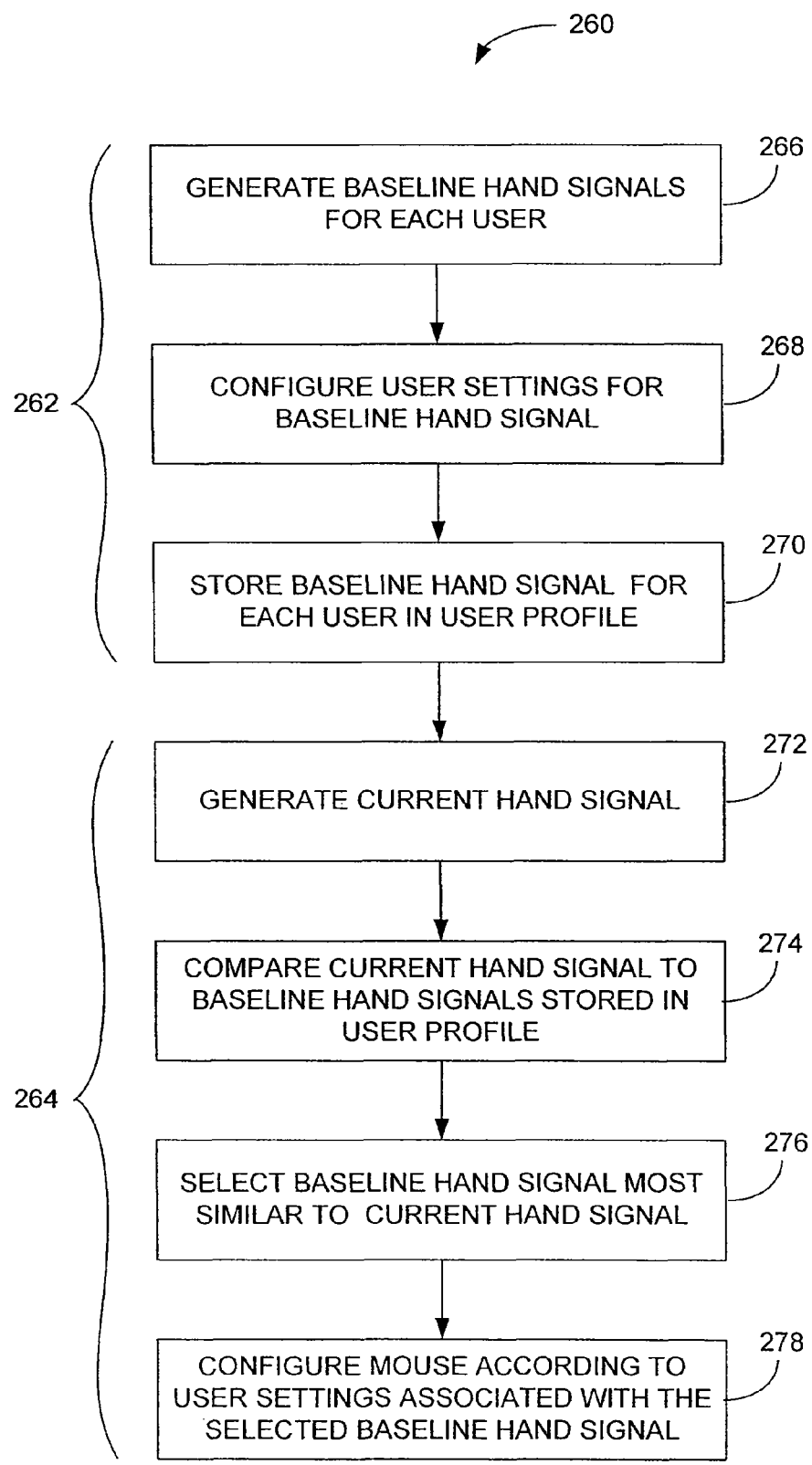
FIG. 11 is an actual user determination method, in accordance with one embodiment of the present invention.

FIG. 11 is an actual user determination method 260, in accordance with one embodiment of the present invention. By way of example, the method may be included in block 226 of FIG. 9. The method is generally performed in multiple steps including a calibration step 262 and an in use step 264. The calibration step 262 is performed before the use step 264. The calibration step is generally performed once while the use step is continuously used during mouse use. The calibration step 262 generally begins at block 266 where baseline hand signals are generated for each user. Following block 266 the process flow proceeds to block 268 where the user settings (e.g., motion axis, button zones) for the baseline hand signal are configured. Following block 268, the process flow proceeds to block 270 where the baseline hand signal and user settings are stored in a user profile database.

The use step 264 generally begins at block at block 272 where a current hand signal is generated. Following block 272, the process flow proceeds to block 274 where the current hand signal is compared to the baseline hand signals stored in the user profile database. Following block 274, the process flow proceeds to block 276 where the baseline hand signal most similar to the current hand signal is selected. If there is no signal similar to the current signal then the user may be prompted to go through the calibration step 262. Following block 276, the process flow proceeds to block 268 where the mouse is configured according to the user settings associated with the selected baseline hand signal.

Figure 12:
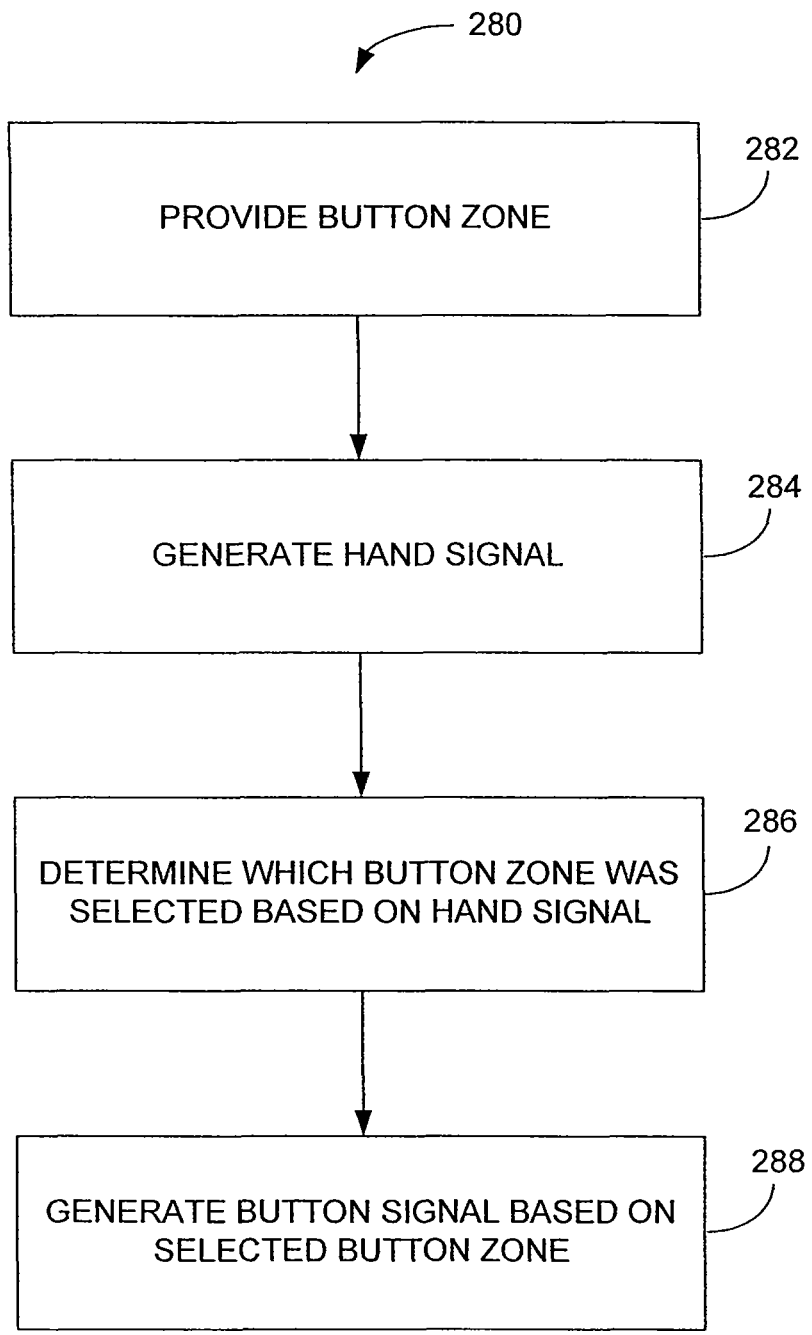
FIG. 12 is an absolute mapping method, in accordance with one embodiment of the present invention.

FIG. 12 is an absolute mapping method 280, in accordance with one embodiment of the present invention. By way of example, the method 280 may be included in block 232 of FIG. 9. The method 280 generally begins at block 282 where one or more button zones are provided. Button zones are area of the mouse that may be actuated by a user to implement an action. The button zones may be based on a training sequence, selected from a menu, or they may be preset. Following block 282 the process flow proceeds to block 284 where a hand signal is generated. Following block 284, the process flow proceeds to block 286 where a determination is made as to which button zone was selected based on the hand signal. For example, position coordinates generated by touch may correspond to a particular button zone. Following block 286, the process flow proceeds to block 288 where a button signal is generated based on the selected button zone.

Figure 13:
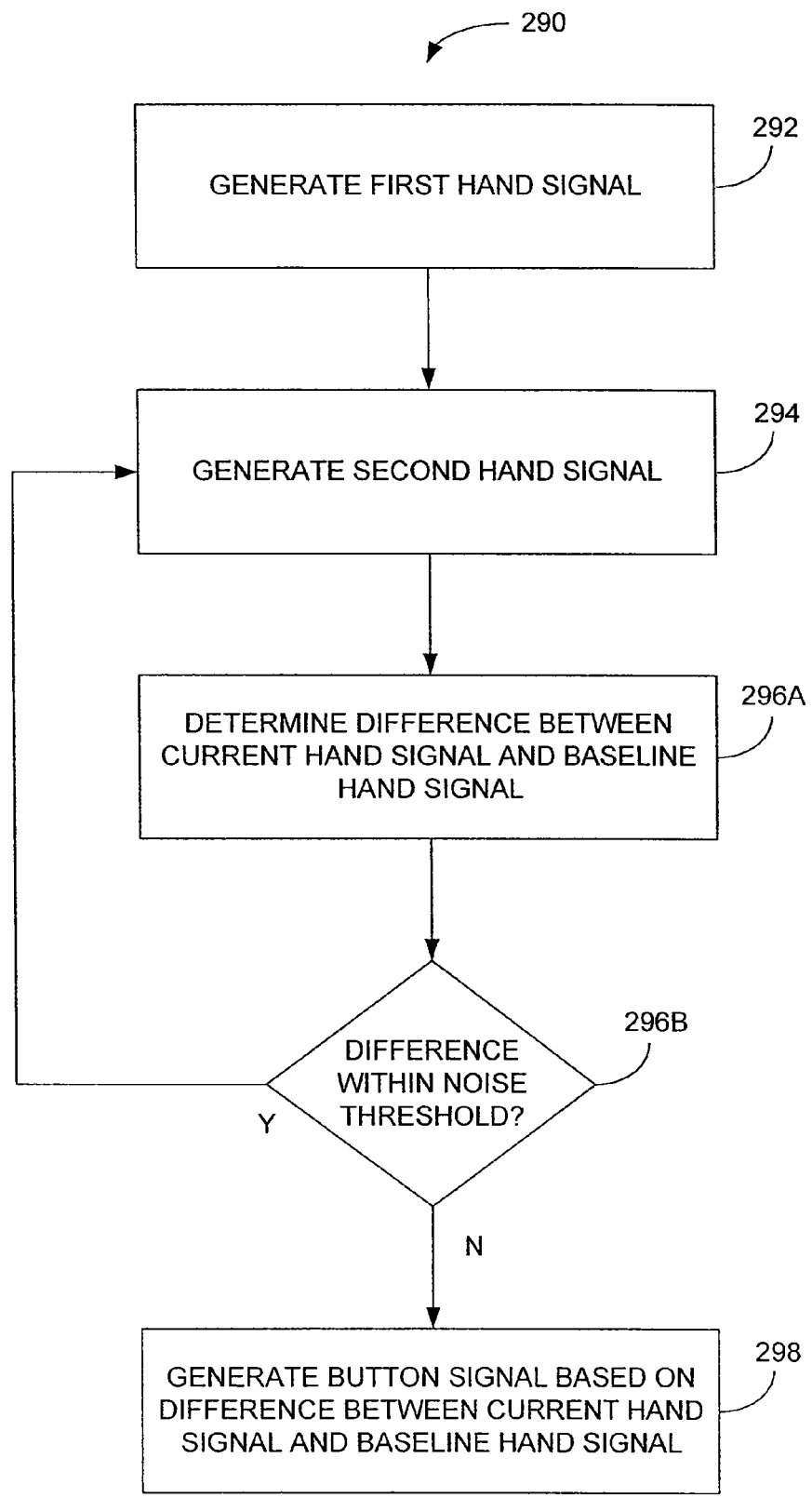
FIG. 13 is a relative mapping method, in accordance with one embodiment of the present invention.

FIG. 13 is a relative mapping method 290, in accordance with one embodiment of the present invention. By way of example, the method may be included in block 232 of FIG. 9. The method 290 generally begins at block 292 where a first hand signal is generated. Following block 292, the process flow proceeds to block 294 where a second hand signal is generated. In this embodiment, the first hand signal generally corresponds to a hand signal generated before the second hand signal. For example, the first hand signal may be the last hand signal while the second hand signal may be the current hand signal. Following block 294, the process flow proceeds to block 296 where the difference between the current hand signal and the baseline hand signal is determined. If the difference is within a threshold value, then the process flow proceeds back to block 294. This serves as a filter element or noise reduction. As should be appreciated, the user tends to continuously adjust hand position during use even if they are not making a selection (e.g., noise). If the difference is outside a threshold value then the process flow proceeds to block 298 where a button signal is generated based on the difference between the first hand signal and the second hand signal.

Figure 14:
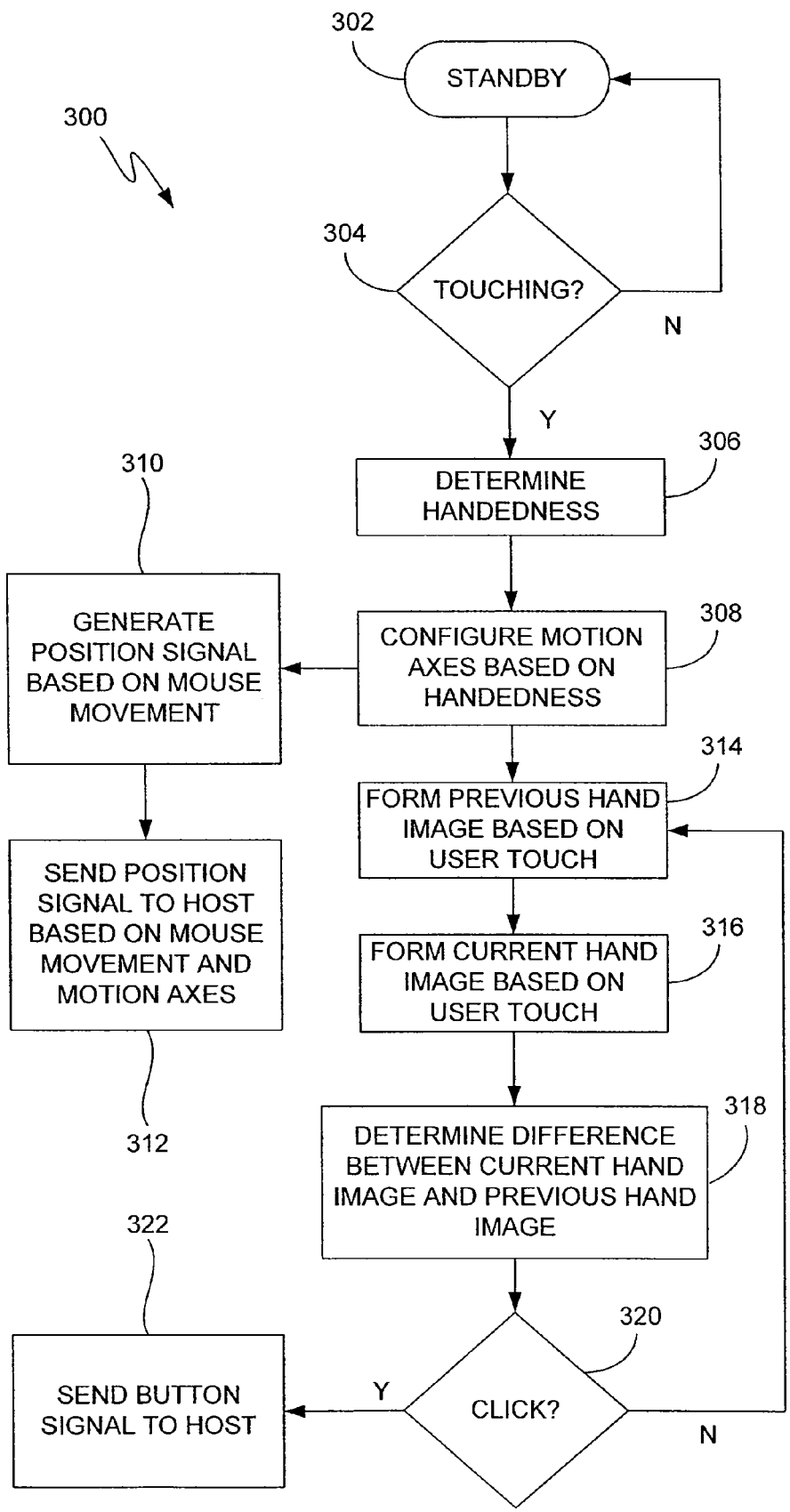
FIG. 14 is a mouse operational method, in accordance with one embodiment of the present invention.

FIG. 14 is a mouse operational method 300, in accordance with one embodiment of the present invention. By way of example the method 300 may be performed using the system shown in FIG. 5. The method 300 generally begins at block 302 where the mouse is in standby. Following block 302, the process flow proceeds to block 304 where a determination is made as to whether the user is touching the mouse. If it is determined that the user is not touching the mouse, then the process flow proceeds back to block 302 thereby keeping the mouse in standby. If it is determined that the user is touching the mouse, then the process flow proceeds to block 306 where the handedness of user is determined. By way of example, this may be accomplished using the method described in FIG. 10.

Following block 306, the process flow proceeds to block 308 where the motion axes are configured based on the handedness determined in block 306. Motion axes generally refer to which portion of the mouse will be used for button selection as well as which direction of mouse motion is positive X motion and which direction of mouse motion is positive Y motion. The direction of the motion axes are important if the mouse is rotated 180 degrees between left and right handed users as in the mouse configuration shown in FIG. 2.

Thereafter, the process flow proceeds along two routes. The first route proceeds with block 310 where position signals are generated based on mouse movement. Thereafter in block 312, a position signal is sent to a host based on the mouse movement and the motion axis set in block 308. The second route proceeds with a relative mapping sequence including blocks 314-320. In block 314, a previous hand image is formed based on user touch. Following block 314, the process flow proceeds to block 316 where a current hand image is formed based on user touch. Thereafter, in block 318 a difference between the current hand image and the previous hand image is determined. Following block 318, the process flow proceeds to block 320 where a determination is made as to whether a click (e.g., button selection) was made by the user based on the difference. If a click or button selection was not made, then the process flow proceeds back to block 314. If a click of button selection was made then the process flow proceeds to block 322 where a button signal associated with the button selection is sent to the host.

The methods described above can be used alone or in various combinations. The methods may be implemented singularly or by a combination of hardware, software, and/or firmware. The methods can also be embodied as computer readable code on a computer readable medium. The computer readable medium is any data storage device that can store data, which can thereafter be read by a computer system. The computer readable medium can also be distributed over a network coupled computer systems so that the computer readable code is stored and executed in a distributed fashion.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for operating an input device, comprising:
    detecting a touch caused by an object in contact with a touch sensitive surface of the input device, the touch sensitive surface divided into an array of sensing points, each sensing point configured for generating a signal in response to sensing a touch on the sensing point;
    generating a hand signal in response to the detected touch, wherein the hand signal is generated by combining signals generated at one or more sensing points that sense the detected touch;
    determining a user profile based on the generated hand signal, the user profile indicating an identity of a user touching the input device, wherein determining the user profile further comprises comparing the generated hand signal to baseline hand signals stored in different user profiles and selecting a baseline hand signal that is most similar to the generated hand signal; and
    configuring the input device according to the user profile associated with the selected baseline hand signal.

2. The method as recited in claim 1, further comprising determining handedness of the user based on the generated hand signal.

3. The method as recited in claim 1, wherein the input device is a mouse, further comprising setting motion axes of the mouse according to the user identity.

4. The method as recited in claim 3 wherein the motion axes are further set based on a determined handedness of the user, wherein the determined handedness of the user is determined by comparing the generated hand signal to baseline right hand signals and baseline left hand signals stored in user profiles.

5. The method as recited in claim 1 further comprising configuring one or more button zones in the touch sensitive surface of the input device, each button zone configurable for generating a function signal when the button zone is touched to actuate a function.

6. The method as recited in claim 5 wherein the button zones are located at both a forward side and a rear side of the touch sensitive surface, and based on the handedness of the user, the button zones located at either the forward side or the rear are actuated, wherein the handedness of the user is determined by comparing the generated hand signal to baseline right hand signals and baseline left hand signals stored in user profiles.

7. The method as recited in claim 5 wherein some of the button zones are actuated for generating functional signals based on the identity of the user.

8. The method as recited in claim 1, further comprising:
    providing one or more button zones in the touch sensitive surface of the input device, each button zone configurable for generating a function signal when the button zone is touched to actuate a function;
    determining which button zone was selected based on the generated hand signal; and
    generating a function signal based on the selected button zone.

9. The method as recited in claim 1, further comprising:
    generating a first hand signal corresponding to a first touch on the input device;
    generating a second hand signal corresponding to a second touch on the input device;
    comparing the first and second hand signals to determine a difference; and
    generating a function signal based on the determined difference, the function signal actuating an input device function.

10. The method as recited in claim 1, wherein the input device is a mouse, further comprising:
    monitoring a movement of the mouse;
    generating position signals based on the movement of the mouse;
    monitoring a hand action of the user operating the mouse during the movement of the mouse, the monitored hand action represented by a plurality of hand signals; and
    generating function signals based on the hand action,
    wherein the position signals and function signals actuate an action in a host system operatively coupled to the mouse.

11. The method as recited in claim 1, further comprising: for each user holding the mouse, generating one or more baseline hand signals, configuring the user's settings based on the generated baseline hand signals, and storing the baseline hand signals in the user's profile.

12. A method for determining a user operating an input device, comprising:
    storing baseline hand signals for different users in each user's profile;
    generating a current hand signal when a touch is detected on a touch sensitive surface of the input device, the touch sensitive surface divided into an array of sensing points, each sensing point configured for generating a signal in response to sensing a touch on the sensing point, wherein the current hand signal is generated by combining signals generated at one or more sensing points that sense the detected touch;
    comparing the current hand signal to the stored baseline hand signals;
    determining if the current hand signal is similar to one of the stored baseline hand signals;
    selecting a baseline hand signal that is most similar to the current hand signal
    using the selected baseline hand signal to determine a handedness of the user touching the input device to cause the detected touch; and
    based on the comparison, determining a particular user profile, the determined user profile indicating an identity of the user touching the input device to cause the detected touch.

13. The method as recited in claim 12 further comprising using the selected baseline hand signal to determine the identity of the user touching the input device to cause the detected touch.

14. The method as recited in claim 12, wherein the input device is a mouse, further comprising configuring the mouse for right-handed use if the selected baseline hand signal is a right hand signal, and configuring the mouse for left-handed use if the selected baseline hand signal is a left hand signal.

15. A method for operating a mouse, comprising:
    detecting a touch caused by an object in contact with a touch sensitive surface of the mouse, the touch sensitive surface divided into an array of sensing points, each sensing point configured for generating a signal in response to sensing a touch on the sensing point;
    generating a hand signal in response to the detected touch, wherein the hand signal is generated by combining signals generated at one or more sensing points that sense the detected touch;
    determining a handedness of the user holding the mouse based on the generated hand signal;

configuring motion axes of the mouse based on the determined handedness of the user, the configured motion axes defining a direction of movement for the mouse;

monitoring movement of the mouse; and generating position signals based on mouse movement.

16. The method as recited in claim 15, further comprising determining an identity of the user holding the mouse based on the generated hand signal.

17. The method as recited in claim 15, further comprising:
forming first and second hand images associated with the detected touch;
comparing the first and second hand images to determine a hand action; and
generating a function signal corresponding to the determined hand action.

18. The method as recited in claim 17, further comprising sending the function signal and position signals to a host system coupled to the mouse, the host system configured to perform the hand action based on the function signal and position signals.

19. A user configurable input device comprising:
a touch sensitive surface divided into an array of sensing points, each sensing point configured for generating a signal in response to sensing a touch on the sensing point, wherein signals generated at one or more sensing points that sense the detected touch are combined to generate a hand signal; and
a processor configured for receiving the hand signal and determining from the hand signal a user profile that indicates at least an identity of a user touching the input device, wherein determining the user profile further comprises comparing the generated hand signal to baseline hand signals stored in different user profiles and selecting a baseline hand signal that is most similar to the generated hand signal, the processor further configured for automatically configuring the input device according to a user profile associated with the selected baseline hand signal.

20. The input device as recited in claim 19, wherein the processor is further configured for determining handedness of the user based on the received hand signal.

21. The input device as recited in claim 19, wherein the input device is a mouse, and the processor is further configured for setting motion axes of the mouse according to the determined user identity.

22. The input device as recited in claim 19, wherein the touch sensitive surface comprises one or more button zones, each button zone configurable for generating a function signal when the button zone is touched to actuate a function.

23. The input device as recited in claim 22, wherein the processor is further configured for determining which button zone was selected based on the hand signal and generating a function signal based on the selected button zone.

24. The input device as recited in claim 19, wherein the processor is further configured for receiving a first hand signal corresponding to a first touch on the input device and a second hand signal corresponding to a second touch on the input device, comparing the first and second hand signals to determine a difference, and generating a function signal based on the determined difference, the function signal actuating an input device function.

25. The input device as recited in claim 19, wherein the input device is a mouse, and the processor is further configured for monitoring a movement of the mouse, generating position signals based on the movement of the mouse, monitoring a hand action of the user operating mouse during the movement of the mouse, the monitored hand action represented by a plurality of hand signals, and generating function signals based on the hand action, wherein the position signals and function signals actuate an action in a host system operatively coupled to the mouse.

* * * * *